US012656998B2

(12) United States Patent
Wang et al.

(10) Patent No.: US 12,656,998 B2
(45) Date of Patent: Jun. 16, 2026

(54) TECHNIQUES FOR ALARM SOUND PROCESSING IN NOISY ENVIRONMENTS

(71) Applicant: Beijing Honor Device Co., Ltd., Beijing (CN)

(72) Inventors: Zhichao Wang, Beijing (CN); Yu Wang, Beijing (CN)

(73) Assignee: BEIJING HONOR DEVICE CO., LTD., Beijing (CN)

( * ) Notice: Subject to any disclaimer, the term of this patent is extended or adjusted under 35 U.S.C. 154(b) by 183 days.

(21) Appl. No.: 18/291,854

(22) PCT Filed: Sep. 1, 2022

(86) PCT No.: PCT/CN2022/116528
§ 371 (c)(1),
(2) Date: Jan. 24, 2024

(87) PCT Pub. No.: WO2023/071519
PCT Pub. Date: May 4, 2023

(65) Prior Publication Data
US 2024/0411507 A1 Dec. 12, 2024

(30) Foreign Application Priority Data
Oct. 26, 2021 (CN) .......................... 202111248720.6

(51) Int. Cl.
*H04R 1/10* (2026.01)
*G06F 3/16* (2006.01)
(Continued)

(52) U.S. Cl.
CPC .............. *G06F 3/165* (2013.01); *G10K 11/18* (2013.01); *H04R 1/1083* (2013.01); *H04S 7/302* (2013.01); *H04S 2400/11* (2013.01)

(58) Field of Classification Search
CPC ......... H04R 1/083; H04R 5/033; H04S 7/302; H04S 7/304; H04S 2400/11
See application file for complete search history.

(56) References Cited

U.S. PATENT DOCUMENTS 9,788,101 B2 * 10/2017 Chizi ................... G10K 11/175
10,067,737 B1 9/2018 Ozery
(Continued)

FOREIGN PATENT DOCUMENTS

CN 102624980 A 8/2012
CN 107767697 A 3/2018
(Continued)

*Primary Examiner* — James K Mooney
(74) *Attorney, Agent, or Firm* — WOMBLE BOND DICKINSON (US) LLP

(57) ABSTRACT

An audio information processing method, an electronic device, and a computer-readable storage medium are disclosed. The audio information processing method includes: obtaining audio information, where the audio information is obtained by collecting sounds of an environment in which an electronic device is located; determining that the audio information includes an alarm sound; determining first location information of the alarm sound based on the audio information; determining a first sound, where the first sound includes second location information, both the first sound and the second location information are used to indicate an acoustic source direction of the alarm sound; and playing the first sound. The audio information is obtained by collecting the sounds of the environment in which the electronic device is located. When the audio information includes an alarm sound, the first sound used to indicate the acoustic source direction of the alarm sound is played.

19 Claims, 11 Drawing Sheets

(51) Int. Cl.
    *G10K 11/18*      (2006.01)
    *H04S 7/00*      (2006.01)

(56)          References Cited

U.S. PATENT DOCUMENTS

| | | | |
|---|---|---|---|
| 10,403,141 B2 | 9/2019 | Yukio et al. | |
| 10,810,881 B2 | 10/2020 | Jang et al. | |
| 2011/0026745 A1 | 2/2011 | Said et al. | |
| 2012/0268563 A1* | 10/2012 | Chou | G01S 15/86 |
| | | | 381/310 |
| 2014/0301556 A1 | 10/2014 | Wang et al. | |
| 2015/0222977 A1* | 8/2015 | Angel, Jr. | H04R 1/105 |
| | | | 381/74 |
| 2017/0359672 A1* | 12/2017 | Lyren | H04S 7/303 |
| 2018/0206038 A1 | 7/2018 | Tengelsen et al. | |
| 2019/0206256 A1 | 7/2019 | Starke | |
| 2020/0356341 A1 | 11/2020 | Satongar et al. | |
| 2022/0091674 A1* | 3/2022 | Kemmerer | G10K 11/17837 |

FOREIGN PATENT DOCUMENTS

| | | | |
|---|---|---|---|
| CN | 107985225 A | 5/2018 | |
| CN | 108600885 A | 9/2018 | |
| CN | 110001512 A | 7/2019 | |
| CN | 111398965 A | 7/2020 | |
| CN | 111432305 A | 7/2020 | |
| CN | 111818441 A | 10/2020 | |
| CN | 114189790 A | 3/2022 | |

* cited by examiner

CONT.
FROM
FIG. 4A

CONT.
FROM
FIG. 4A

CONT.
FROM
FIG. 4A

S407. The noise reduction
headphones play the 3D
notification sounds

S408.
Determine
whether
a difference between the
location information of the alarm
sound relative to the user and location
information of a previous alarm
sound relative to the user is
within a
preset range No Yes S409. Detect
whether the audio
information and the previous
audio information that includes the
alarm sound are a
same
sound No Yes S410. The mobile phone generates a
distance coefficient S411. The mobile phone processes a
standard alarm sound based on the
location information of the alarm sound
relative to the user and the distance
coefficient to obtain 3D notification
sounds with energy gains S412. The mobile phone sends the 3D
notification sounds with the energy gains
to the noise reduction headphones S413. The noise reduction
headphones play the 3D notification
sounds with the energy gains

FIG. 4B

CONT.
FROM
FIG. 7A

CONT.
FROM
FIG. 7A

CONT.
FROM
FIG. 7A

S708. Determine whether a Difference between the location information of the alarm sound relative to the user and location information of a previous alarm sound relative to the user is within a preset range No S707. Play the 3D notification sounds Yes S709. Detect whether the audio information and the previous audio information that includes the alarm sound are a same sound No Yes S710. Generate a distance coefficient S711. Process a standard alarm sound based on the location information of the alarm sound relative to the user and the distance coefficient to obtain 3D notification sounds with energy gains S712. The smart watch sends the 3D notification sounds with the energy gains to the noise reduction headphones S713. Play the 3D notification sounds with the energy gains

FIG. 7B

TECHNIQUES FOR ALARM SOUND PROCESSING IN NOISY ENVIRONMENTS

CROSS-REFERENCE TO RELATED APPLICATIONS

This application is a national stage of International Application No. PCT/CN2022/116528, filed on Sep. 1, 2022, which claims priority to Chinese Patent Application No. 202111248720.6, filed on Oct. 26, 2021. The disclosures of both of the aforementioned applications are hereby incorporated by reference in their entireties.

TECHNICAL FIELD

This application relates to the field of audio processing technologies, and in particular, to an audio information processing method, an electronic device, a system, a computer program product, and a computer-readable storage medium.

BACKGROUND

When a user wears noise reduction headphones outdoors, sounds around the user are blocked out by the noise reduction headphones. If there is a danger around the user, for example, a vehicle approaches the user, because the sounds around are blocked out by the noise reduction headphones, the user cannot hear the whistle of the vehicle, resulting in a safety problem.

In addition, even if the noise reduction headphones have a transparency mode, the noise reduction headphones do not completely block out the ambient sounds, and cannot ensure the safety of the user when the environment is noisy.

SUMMARY

This application provides an audio information processing method, an electronic device, a computer program product, and a computer-readable storage medium, to notify a user of an alarm sound around even when the user wears noise reduction headphones.

To achieve the foregoing objective, the following technical solutions are provided in this application.

According to a first aspect, this application provides audio information processing method applied to an electronic device. The audio information processing method includes: obtaining audio information, where the audio information is obtained by collecting sounds of an environment in which the electronic device is located; determining that the audio information includes an alarm sound; determining first location information of the alarm sound based on the audio information; determining a first sound, where the first sound includes second location information, both the first location information and the second location information are used to indicate an acoustic source direction of the alarm sound, and the second location information is the same as or different from the first location information; and playing the first sound.

In the foregoing audio information processing method, the first location information and the second location information may be relative location information of the alarm sound relative to the user, or may be absolute location information of the alarm sound. In addition, that the first location information is the same as the second location information may be understood as that two values are the same; and that the first location information is different from the second location information may be understood as that the two are similar or are within a range, and if the first location information and the second location information are both angles, it may be understood as that a difference between the two angles is within an angle range, for example, is 1°.

It can be learned from the foregoing description that the audio information is obtained by collecting the sounds of the environment in which the electronic device is located. When the audio information includes an alarm sound, the first sound used to indicate the acoustic source direction of the alarm sound is played. Therefore, it can be ensured that when an alarm sound appears around a user, the user can hear the alarm sound from the first sound played by headphones worn by the user.

In a possible implementation, before the determining a first sound, where the first sound includes second location information, the method further includes: determining that the audio information and previous audio information that includes an alarm sound have not been obtained within preset duration;

In a possible implementation, the method further includes: determining that the audio information and the previous audio information that includes the alarm sound are obtained within the preset duration; determining that a difference between the first location information of the alarm sound in the audio information and first location information of the alarm sound in the previous audio information that includes the alarm sound are within a preset range, detecting that the alarm sound in the audio information and the alarm sound in the previous audio information that includes the alarm sound are a same sound, and generating a distance coefficient, where the distance coefficient is used to represent an energy gain of the audio information relative to the previous audio information that includes the alarm sound; determining a second sound, where the second sound includes the second location information and the energy gain; and playing the second sound.

In this possible implementation, the difference between the first location information of the alarm sound in the audio information and the first location information of the alarm sound in the previous audio information that includes the alarm sound is within the preset range. The alarm sound in the audio information and the alarm sound in the previous audio information that includes the alarm sound are a same sound, and it indicates that there are two consecutive alarm sounds around the user. Therefore, the second sound used to indicate the acoustic source direction of the alarm sound and carrying an energy gain is played, to ensure that the user is particularly reminded by using the second sound including the energy gain.

In a possible implementation, the playing the first sound includes: sending the first sound to headphones, and playing, by the headphones, the first sound.

In a possible implementation, the playing the second sound includes: sending the second sound to headphones, and playing, by the headphones, the second sound.

In a possible implementation, the determining first location information of the alarm sound based on the audio information includes: locating, by using the audio information, an acoustic source of the alarm sound based on an acoustic source localization algorithm of a microphone array to obtain the first location information of the alarm sound.

In a possible implementation, the determining first location information of the alarm sound based on the audio information includes: determining third location information of the alarm sound based on the audio information, where the third location information is used to indicate an acoustic source direction of the alarm sound relative to the electronic device; and performing coordinate transformation on the third location information of the alarm sound to obtain the first location information of the alarm sound.

In a possible implementation, the determining a first sound, where the first sound includes second location information includes: obtaining a standard sound; and processing the standard sound based on the first location information of the alarm sound to obtain the first sound, where the first sound includes the second location information.

In a possible implementation, the processing the standard sound based on the first location information of the alarm sound to obtain the first sound includes: obtaining a head-related impulse response HRIR value corresponding to the first location information of the alarm sound; and separately performing convolutional processing on the standard sound and the HRIR value to obtain the first sound.

In a possible implementation, the processing the standard sound based on the first location information of the alarm sound to obtain the first sound includes: obtaining a head-related transfer function HRTF value corresponding to the first location information of the alarm sound; and performing Fourier transform on the standard sound, and multiplying the standard value by the HRTF value to obtain the first sound.

In a possible implementation, the detecting that the alarm sound in the audio information and the alarm sound in the previous audio information that includes the alarm sound are a same sound includes: separately performing time domain to frequency domain conversion on the audio information and the previous audio information that includes the alarm sound to obtain amplitude spectra of the audio information and the previous audio information that includes the alarm sound; and performing similarity calculation on the audio information and the previous audio information that includes the alarm sound by using the amplitude spectra of the audio information and the previous audio information that includes the alarm sound to obtain a calculation result, where the calculation result is used to represent whether the audio information and the previous audio information that includes the alarm sound are a same sound.

In a possible implementation, the performing similarity calculation on the audio information and the previous audio information that includes the alarm sound by using the amplitude spectra of the audio information and the previous audio information that includes the alarm sound to obtain a calculation result includes: performing similarity calculation on the audio information and the previous audio information that includes the alarm sound by using a Pearson correlation function to obtain a similarity, where if the similarity is greater than a threshold, the audio information the previous audio information that includes the alarm sound are a same sound; or if the similarity is not greater than a threshold, the audio information and the previous audio information that includes the alarm sound are not a same sound.

In a possible implementation, the performing similarity calculation on the audio information and the previous audio information that includes the alarm sound by using the amplitude spectra of the audio information and the previous audio information that includes the alarm sound to obtain a calculation result includes: predicting, by using a classification model, whether the audio information and the previous audio information that includes the alarm sound are a same sound.

In a possible implementation, the detecting that the alarm sound in the audio information and the alarm sound in the previous audio information that includes the alarm sound are a same sound includes: separately extracting an alarm sound from the audio information and the previous audio information that includes the alarm sound; and determining whether the two extracted alarm sounds are a same alarm sound.

In a possible implementation, the determining whether the two extracted alarm sounds are a same alarm sound includes: separately performing time domain to frequency domain conversion on the two extracted alarm sounds to obtain amplitude spectra of the two extracted alarm sounds; and performing similarity calculation on the two extracted alarm sounds by using the amplitude spectra of the two extracted alarm sounds to obtain a calculation result, where the calculation result is used to represent whether the two extracted alarm sounds are a same alarm sound.

In a possible implementation, the performing similarity calculation on the two extracted alarm sounds by using the amplitude spectra of the two extracted alarm sounds to obtain a calculation result includes: performing similarity calculation on the two extracted alarm sounds by using a Pearson correlation function to obtain a similarity, where if the similarity is greater than a threshold, the two extracted alarm sounds are a same alarm sound; or if the similarity is not greater than a threshold, the two extracted alarm sounds are not a same alarm sound.

In a possible implementation, the performing similarity calculation on the two extracted alarm sounds by using the amplitude spectra of the two extracted alarm sounds to obtain a calculation result includes: predicting, by using a classification model, whether the two extracted alarm sounds are a same alarm sound.

In a possible implementation, after the generating a distance coefficient, the method further includes: determining that the distance coefficient is within a range of the distance coefficient.

In a possible implementation, the method further includes: determining that the distance coefficient is out of the range of the distance coefficient; determining a third sound, where the third sound includes the second location information and energy gains represented by endpoint values of the range of the distance coefficient; and playing the third sound.

In this possible implementation, when the distance coefficient is out of the range of the distance coefficient, an endpoint value of the range of the distance coefficient is used as a distance coefficient to determine the third sound, and the third sound is played. In this way, extremely high or low volume, caused by an extremely large or small generated distance coefficient, of playing a sound with an energy gain can be avoided.

In a possible implementation, the determining that the audio information includes an alarm sound includes: invoking an alarm sound detection model to detect whether the audio information includes the alarm sound to obtain a detection result, where the detection result is used to indicate whether the audio information includes the alarm sound.

According to a second aspect, this application provides an electronic device, including: one or more processors, a memory, and a wireless communication module, where the memory and the wireless communication module are coupled to the one or more processors, the memory is configured to store computer program code, the computer program code includes computer instructions, and when the one or more processors execute the computer instructions, the electronic device performs the audio information processing method according to any one of the implementations of the first aspect.

According to a third aspect, this application provides a computer storage medium, configured to store a computer program, where when executed, the computer program is specifically configured to implement the audio information processing method according to any one of the implementations of the first aspect.

According to a fourth aspect, this application provides a computer program product, where when the computer program product runs on a computer, the computer is enabled to perform the audio information processing method according to any one of the implementations of the first aspect.

According to a fifth aspect, this application provides an audio information processing system, including an electronic device and headphones, where the electronic device is configured to perform the audio information processing method according to any one of the implementations of the first aspect; and the headphones are configured to interact with the electronic device and play a first sound, a second sound, or a third sound in response to the electronic device.

BRIEF DESCRIPTION OF DRAWINGS

FIG. 4A and FIG. 4B are a sequence diagram of an audio information processing method according to Embodiment 1 of this application;

FIG. 7A and FIG. 7B are a sequence diagram of an audio information processing method according to Embodiment 2 of this application.

DESCRIPTION OF EMBODIMENTS

The following describes the technical solutions in embodiments of this application clearly and completely with reference to the accompanying drawings in the embodiments of this application. The terms used in the following embodiments are for the purpose of describing particular embodiments only and are not intended to be limiting of this application. As used in the appended claims and specification of this application, an expression in the singular such as "a", "an", "the", or "this" includes an expression in the plural such as "one or more", unless clearly indicated to the contrary in the context. It should be further understood that in the embodiments of this application, "one or more" means one, two, or more than two; and the term "and/or" describes an association relationship between associated objects and represents that three relationships may exist. For example, A and/or B may represent that only A exists, both A and B exist, and only B exists, where A and B may be singular or plural. The character "/" generally indicates an "or" relationship between associated objects.

As described in this specification, referring to "one embodiment" or "some embodiments" means that particular features, structures, or characteristics described with reference to one or more embodiments of this application are included in the one or more embodiments. Therefore, the phrases "in one embodiment", "in some embodiments", "in some embodiments", "in some other embodiments", and the like in various places in this specification are not necessarily all refer to the same embodiment, but mean "one or more but not all embodiments" unless specifically emphasized otherwise. The terms "include", "comprise", "have" and their variants mean "including but not limited to" unless specifically emphasized otherwise.

A "plurality of" in the embodiments of this application means two or more. It should be noted that, in the descriptions of the embodiments of this application, terms such as "first" and "second" are only used for a purpose of distinguishing between descriptions, but cannot be understood as indicating or implying relative importance or indicating or implying a sequence.

Figure 1:
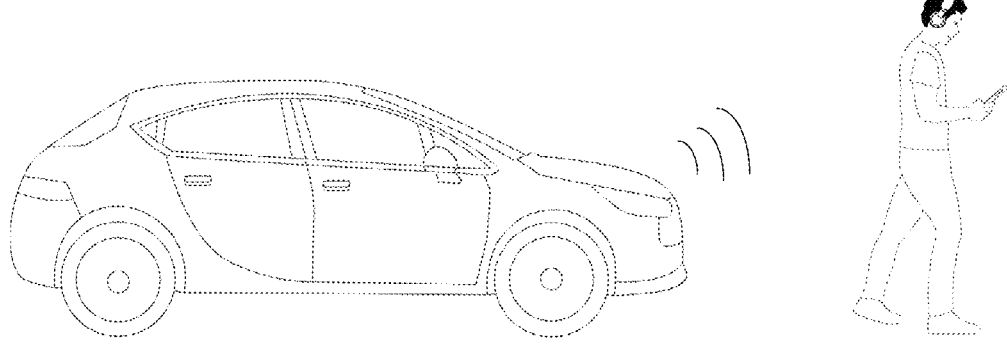
FIG. 1 is a diagram of an application scenario according to an embodiment of this application.

In the application scenario shown in FIG. 1, when a user wears noise reduction headphones outdoors, sounds around the user are blocked out by the noise reduction headphones. If there is a danger around the user, for example, a vehicle approaches the user as shown in FIG. 1, because the sounds around are blocked out by the noise reduction headphones, the user cannot hear the whistle of the vehicle, resulting in a safety problem.

In addition, even if the noise reduction headphones have a transparency mode, the noise reduction headphones do not completely block out the ambient sounds, and cannot ensure the safety of the user when the environment is noisy.

Based on the foregoing problems, an embodiment of this application provides an audio information processing method. The audio information processing method provided in this embodiment of this application may be applied to the application scenario shown in FIG. 1. In this application scenario, the user interacts with the noise reduction headphones through a mobile phone. When an alarm sound indicating danger appears around the user, the noise reduction headphones can notify the user.

Figure 2A:
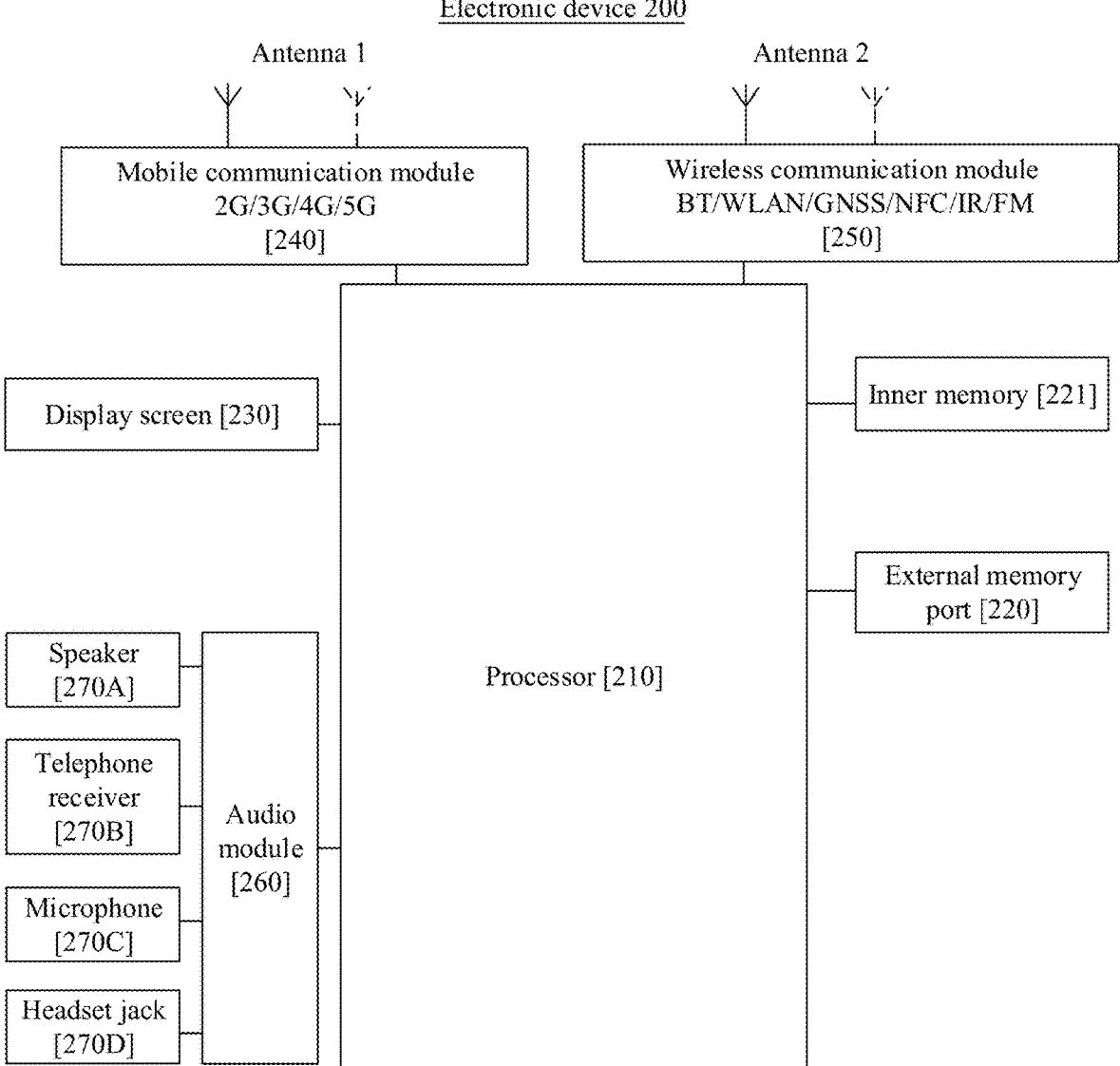
FIG. 2a is a schematic structural diagram of an electronic device according to an embodiment of this application.

FIG. 2a shows a composition example of an electronic device according to an embodiment of this application. A composition structure of a mobile phone provided in this application scenario is also shown in FIG. 2a. In addition, in this embodiment of this application, the user interacts with the noise reduction headphones by using the mobile phone, and the noise reduction headphones send the alarm sound to the user. Furthermore, the user may alternatively interact with the noise reduction headphones by using another electronic device, for example, a tablet computer, a desktop notebook computer, a laptop notebook computer, an ultra-mobile personal computer (Ultra-mobile Personal Computer, UMPC), a handheld computer, a netbook, a personal digital assistant (Personal Digital Assistant, PDA), or a wearable electronic device, and a composition structure thereof is also shown in FIG. 2a.

The electronic device 200 may include: a processor 210, an external memory port 220, an inner memory 221, a display screen 230, an antenna 1, an antenna 2, a mobile communication module 240, a wireless communication module 250, an audio module 260, and the like.

It may be understood that the structure illustrated in this embodiment does not constitute a specific limitation on the electronic device. In some other embodiments, the electronic device may include more or fewer components than those shown in the figure, or some components may be combined, or a different component arrangement may be used. The components shown in the figure may be implemented by hardware, software, or a combination thereof.

The processor 210 may include one or more processing units. For example, the processor 210 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated in one or more processors.

The processor 210 may further be provided with a memory, configured to store instructions and data. In some embodiments, the memory in the processor 210 is a cache. The memory can store instructions or data that were used by the processor 210 or that are recycled. If the processor 210 needs to use the instructions or data again, the processor 210 may directly invoke the instructions or data from the memory, thereby avoiding repeated storage and reading, reducing a waiting time of the processor 210, and improving the efficiency of the system.

The external memory port 220 may be configured to connect to an external memory card, for example, a micro SD card, expanding a storage capability of the electronic device. The external memory card communicates with the processor 210 through the external memory port 220, implementing the data storage function. For example, files such as music and videos can be stored in the external memory card.

The inner memory 221 can be configured to store computer-executable program code, which includes instructions. The processor 210 runs the instructions stored in the inner memory 221 to execute various functional applications and data processing of the electronic device 200. The inner memory 221 may include a program storage area and a data storage area. The program storage area may store an operating system, an application required by at least one function (for example, an audio play function or an image play function), and the like. The data storage area may store data (for example, audio data and a phone book) created by the electronic device during use. In addition, the inner memory 221 may include a high-speed random-access memory, and may further include a non-volatile memory, for example, at least one magnetic disk memory, a flash memory, or a universal flash storage (universal flash storage, UFS). The processor 210 runs the instructions stored in the inner memory 221 and/or the instructions of the memory configured in the processor to execute various functional applications and data processing of the electronic device.

A display function of the electronic device may be implemented by using the GPU, the display screen 230, the application processor, and the like. The GPU is a microprocessor for image processing, and connects the display screen 230 to the application processor. The GPU is configured to perform mathematical and geometric calculations and image rendering. The processor 210 may include one or more GPUs, which execute program instructions to generate or change display information.

A photographing function of the electronic device may be implemented by using an ISP, a camera, a video codec, a GPU, the display screen 230, the application processor, and the like.

A wireless communication function of the electronic device may be implemented by using the antenna 1, the antenna 2, the mobile communication module 240, the wireless communication module 250, the modem processor, the baseband processor, and the like.

The mobile communication module 240 can provide solutions of wireless communication such as 2G/3G/4G/5G. The mobile communication module 240 may receive electromagnetic waves through the antenna 1, and filter and amplify the received electromagnetic waves, and send the electromagnetic waves to the modem processor for demodulation. The mobile communication module 240 may further amplify a signal modulated by the modem processor, and the signal is converted by the antenna 1 into electromagnetic waves for radiation.

The wireless communication module 250 may provide solutions of wireless communication such as a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, or an infrared (infrared, IR) technology applied to the electronic device. The wireless communication module 250 may be one or more components integrated with at least one communication processing module. The wireless communication module 250 receives electromagnetic wave signals through the antenna 2, modulates and filters the electromagnetic wave signals, and sends the processed signals to the processor 210. The wireless communication module 250 may further receive a to-be-sent signal from the processor 210, and amplify the received signal. The amplified signal is converted by the antenna 2 into electromagnetic waves for radiation.

In some embodiments, the Bluetooth module in the wireless communication module 250 is configured to implement short-range communication between the electronic device 200 and another electronic device. For example, the electronic device 200 interacts with the noise reduction headphones through the Bluetooth module. The Bluetooth module may be an integrated circuit, a Bluetooth chip, or the like.

An audio function of the electronic device 200 may be implemented by using the audio module 260, the speaker 270A, a telephone receiver 270B, a microphone 270C, a headset jack 270D, the application processor, and the like. The audio function may be, for example, audio play or recording.

The audio module 260 is configured to convert digital audio information into an analog audio signal for output, and is further configured to convert an analog audio signal into a digital audio signal. The audio module 260 may further be configured to encode and decode an audio signal. In some embodiments, the audio module 260 may be disposed in the processor 210, or some functional modules of the audio module 260 are disposed in the processor 210.

The speaker 270A, also referred to as a "loudspeaker", is configured to convert an audio electrical signals into a sound signal. The electronic device 200 may play music or answer a hands-free call through the speaker 270A.

In some embodiments, the speaker 270A may be configured to play a 3D notification sound described in this embodiment of this application.

The telephone receiver 270B, also referred to as a "receiver", is configured to convert an audio electrical signal into a sound signal. When the electronic device 200 receives a phone call or audio information, the user may put the telephone receiver 270B close to the ear to hear the sound.

The microphone 270C, also referred to as a "voice tube", is configured to convert a sound signal into an electrical signal. When making a phone call or sending audio information, the user may making a sound by approaching the mouth to the microphone 270C to input the sound signal into the microphone 270C. The electronic device 200 may be provided with at least one microphone 270C. In some other embodiments, the electronic device 200 may be provided with two microphones 270C, which can implement a noise reduction function in addition to sound signal collection. In some other embodiments, the electronic device 200 may alternatively be provided with three, four, or more microphones 270C to form a microphone array to implement sound signal collection, noise reduction, sound source identification, directional recording, and the like.

In some embodiments, the microphone 270C is configured to collect sounds of an external environment in which the electronic device is located.

In addition, an operating system is running on the foregoing components. For example, the operating system may be an iOS operating system, an Android operating system, a Windows operating system. An application may be installed and run on the operating system.

Figure 2B:
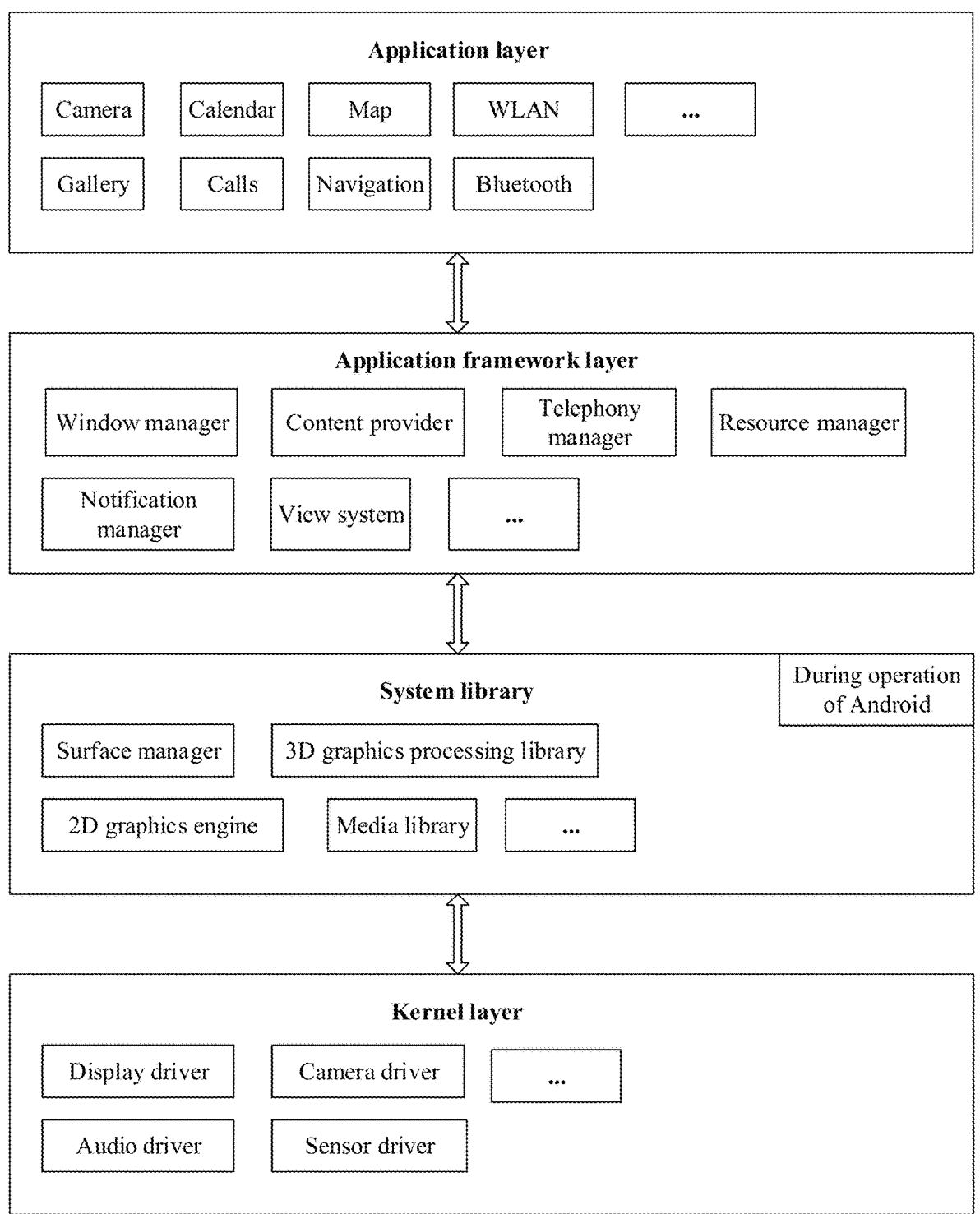
FIG. 2b is a diagram of a software architecture of an electronic device according to an embodiment of this application.

FIG. 2b is a block diagram of a software structure of an electronic device according to an embodiment of this application.

The layered architecture divides the software into several layers, and each layer has a clear role and function. One layer communicates with another layer through a software interface. In some embodiments, an Android system is divided into four layers, which are an application layer, an application framework layer, an Android runtime (Android runtime), a system library, and a kernel layer from top to bottom.

The application program layer may include a series of application packages. As shown in FIG. 2b, the application packages may include applications such as Camera, Gallery, Calendar, Calls, Map, Navigation, WLAN, and Bluetooth.

The application framework layer provides application programming interfaces (application programming interface, API) and programming frameworks for the applications at the application layer. The application framework layer includes some predefined functions. As shown in FIG. 2b, the application framework layer may include a window manager, a content provider, a telephony manager, a resource manager, a notification manager, a view system, and the like.

The window manager is configured to manage a window program. The window manager can obtain a display screen side, and determine whether there is a status bar, a lock screen, a screen shot, or the like.

The content provider is configured to store and obtain data, and enable the data accessible to applications. The data may include a video, an image, an audio, calls made and received, a browsing history, a bookmark, a phone book, and the like.

The telephony manager is configured to provide a communication function for the electronic device, for example, manage a call status (including answering or hanging up a call).

The resource manager provides various resources for the applications, such as localization strings, icons, pictures, layout files, video files, and the like.

The notification manager enables a notification of an application to be displayed in the status bar, and may be configured to convey a notification-type message, which may disappear automatically after a brief pause without user interaction. For example, the notification manager is configured to notify that download is completed or send a message prompt. The notification manager can also display a notification in the status bar at the top of the system in the form of a graph or scroll bar text, such as a notification of an application running in the background, and a notification on the screen in the form of a dialog window. For example, text information is prompted in the status bar, a prompt sound is made, the electronic device vibrates, or the indicator light flashes.

The view system includes a visual control such as a control for displaying text or a control for displaying a picture. The view system can be used to build an application. A display interface may include one or more views. For example, a display interface including an SMS message notification icon may include a view for displaying text and a view for displaying a picture.

The Android runtime includes a core library and a virtual machine. The Android runtime is responsible for Android system scheduling and management. In some embodiments of this application, the cold start of an application runs in the Android runtime, and the Android runtime obtains an optimized file status parameter of the application. Then, the Android runtime can determine, based on the optimized file status parameter, whether an optimized file is out of date due to system upgrade, and return a determining result to an application control module.

The core library includes two parts: a core library of Android and a functional function that needs to be invoked by a Java language.

The application layer and the application framework layer run in the virtual machine. The virtual machine executes Java files of the application layer and the application framework layer as binary files. The virtual machine is used to perform functions such as object life cycle management, stack management, thread management, safety and exception management, and garbage collection.

A system library may include a plurality of functional modules, for example, a surface manager (surface manager), a media library (Media Libraries), a 3D graphics processing library (for example, OpenGL ES), and a 2D graphics engine (for example, SGL).

The surface manager is configured to manage a display subsystem and fuse 2D and 3D layers for a plurality of applications.

The media library supports playback and recording of a variety of formats of commonly used audios and videos and static image files. The media library can support a variety of audio and video encoding formats, for example, MPEG2, H.262, MP3, AAC, AMR, JPG, and PNG.

The 3D graphics processing library is configured to implement 3D graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It should be noted that although the embodiments of this application are described by using the Android system as an example, the basic principle thereof is also applicable to electronic devices based on operating systems such as iOS and Windows.

In the embodiments of this application, the noise reduction headphones are usually Bluetooth headphones. The Bluetooth headphones are headphones supporting a Bluetooth communication protocol. The Bluetooth communication protocol may be a traditional ER Bluetooth protocol, a traditional BDR Bluetooth protocol, or a BLE low-power Bluetooth protocol. Certainly, the Bluetooth communication protocol may alternatively be another new Bluetooth protocol proposed in the future. From a perspective of versions of Bluetooth protocols, a version of the Bluetooth communication protocol may be any of the following: 1.0 series version, 2.0 series version, 3.0 series version, 4.0 series version, or another series version proposed in the future.

The Bluetooth headphones in the embodiments of this application are usually dual Bluetooth headphones including a left headphone and a right headphone, and can provide a user with a stereo sound effect. Common dual Bluetooth headphones include conventional Bluetooth earbuds and true wireless stereo (true wireless stereo, TWS) Bluetooth headphones. The conventional Bluetooth earbuds do not have a connection line between the two headphones and an audio source, but a connection line is still required between the left headphone and the right headphone to synchronize audio signals. However, for the TWS Bluetooth headphones, not only a connection line between the two headphones and the audio source is omitted, but also a connection line between the left headphone and the right headphone is omitted.

The left headphone and the right headphone each are provided with a Bluetooth module. Data is transferred between the left headphone and the right headphone by using a Bluetooth protocol. The left headphone and the right headphone each include a microphone. To be specific, in addition to the audio play function, the main headphone and the secondary headphone also have an audio collection function.

The Bluetooth headphones in this embodiment of this application may be one or more of the following applications: an HSP (Headset Profile) application, an HFP (Hands-free Profile) application, an A2DP (Advanced Audio Distribution Profile) application, and an AVRCP (Audio/Video Remote Control Profile) application.

The HSP application represents a headset application, providing a basic function required by communication between the electronic device and the headphones. The Bluetooth headphones may be used as audio input and output interfaces of the electronic device.

The HFP application represents a hands-free application. Some extended functions are added to the HFP application on the basis of the HSP application. The Bluetooth headphones can control a call process of a terminal, for example, answering, hanging up, or refusing a call, or voice dialing.

The A2DP application represents an advanced audio transmission application. The A2DP can use a chip in the headphones to stack data to achieve high-definition sounds.

The AVRCP application is an audio/video remote control application. The AVRCP application defines the characteristics of how to control streaming media, including pausing, stopping, starting playback, controlling volume, and other types of remote control operations.

It should be further noted that, in the embodiments of this application, the noise reduction headphones may be provided with a start button for a headphone smart alarm sound function. In an example shown in FIG. 3a, the right headphone is provided with a start button 101 for the headphone smart alarm sound function, and the start button 101 may include a first position 11 and a second position 22. When the start button 101 is located at the first position 11, the headphone smart alarm sound function is enabled. When the start button 101 is located at the second position 22, the headphone smart alarm sound function is disabled.

The start button of the headphone smart alarm sound function and a button of another function of the noise reduction headphones may be the same button, or the start button of the headphone smart alarm sound function may be a separately button.

After the headphone smart alarm sound function of the noise reduction headphones is enabled, when the noise reduction headphones determine that there is an alarm sound around the user, the noise reduction headphones may play the alarm sound to the user. A category of the alarm sound played by the noise reduction headphones to the user may be set. Still refer to the example shown in FIG. 3a. The left headphone is provided with an alarm sound selection button 102. An alarm sound is selected by triggering the alarm sound selection button 102.

In some embodiments, the user taps the alarm sound selection button 102, and the noise reduction headphones play an audio of selecting the alarm sound in response to the tapping operation of the user. In an example, there are three types of alarm sound: a default alarm sound, a smart recommended alarm sound, and a manually selected alarm sound. The default alarm sound is an alarm sound set by the system. The smart recommended alarm sound may vary based on different operation states of the noise reduction headphones. In the manually selected alarm sound mode, the user may tap the alarm sound selection button 102 to manually select different alarm sounds, for example, whistles of different types of vehicles.

Figure 3A:
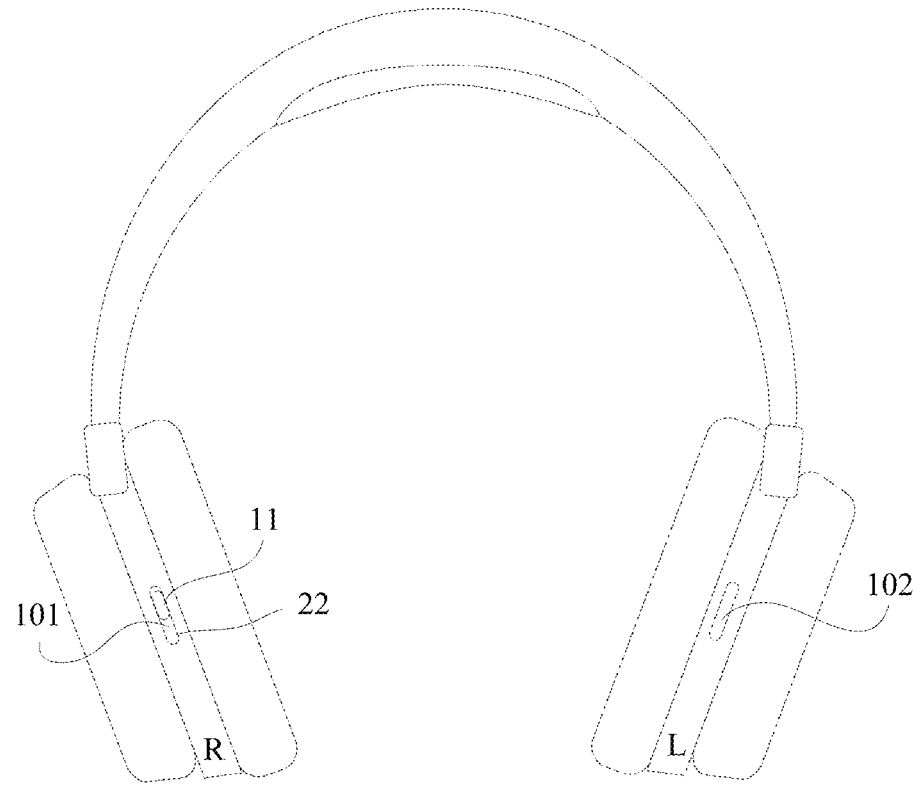
FIG. 3a is a schematic diagram of noise reduction headphones according to an embodiment of this application.

It should be noted that FIG. 3a is described by using a Bluetooth headset as an example, but this does not constitute any limitation on the Bluetooth headphones described in the embodiments of this application. In addition, the start button 101 and the alarm sound selection button 102 shown in FIG. 3a are physical buttons. In some embodiments, the start button 101 and the alarm sound selection button 102 may alternatively be virtual buttons.

The left headphone or the right headphone of the Bluetooth headphones may be provided with a virtual button, and the headphone smart alarm sound function is enabled by triggering the virtual button. The virtual button may be triggered in a plurality of forms. In some embodiments, the headphone smart alarm sound function is enabled or disabled by touching the virtual button for different duration. In some other embodiments, the headphone smart alarm sound function is enabled or disabled by touching the virtual button for different quantities of times. In some other embodiments, the headphone smart alarm sound function is enabled or disabled by touching different positions of the virtual button.

Similarly, the left headphone or the right headphone of the Bluetooth headphones may also be provided with a virtual button, and different alarm sounds are selected by triggering the virtual button. The virtual button may also be triggered in a plurality of forms. In some embodiments, different alarm sounds are selected by touching the virtual button for different duration. In some other embodiments, different alarm sounds are selected by touching the virtual button for different quantities of times. In some other embodiments, different alarm sounds are selected by touching different positions of the virtual button.

Alternatively, the electronic device may be used to enable or disable the headphone smart alarm sound function and select different alarm sounds.

Figure 3B:
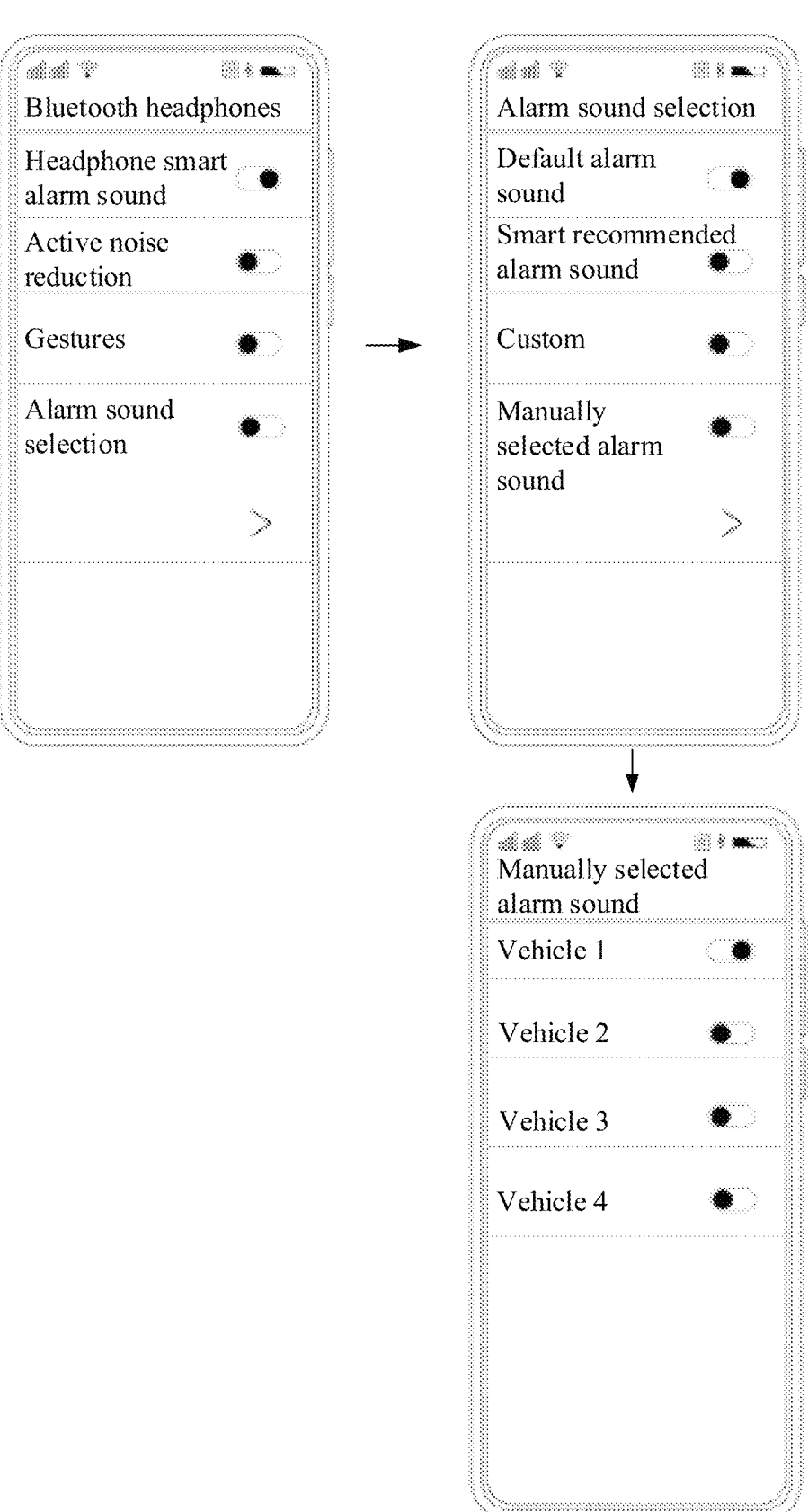
FIG. 3b is a schematic diagram of interfaces according to an embodiment of this application.

Refer to an example in FIG. 3b. A settings screen of the Bluetooth headphones of the electronic device displays a headphone smart alarm sound, active noise reduction, gestures, and alarm sound selection. The user may enable a corresponding function by tapping a start button of each function. In the example shown in FIG. 3b, the headphone smart alarm sound is enabled, and the remaining three functions are disabled.

It should be noted that when the headphone smart alarm sound is enabled, the noise reduction headphones connected to the mobile phone the Bluetooth can interact with the mobile phone, so that when an alarm sound indicating danger appears around the user, an alarm sound is played.

After the alarm sound selection is enabled, the user may manually select an alarm sound to be displayed when an alarm sound indicating danger appears around the user.

The alarm sound selection has a sub interface. The user taps the start button of the alarm sound select to enable the alarm sound, and the sub interface of the alarm sound selection is displayed. In the example shown in FIG. 3b, the sub interface of the alarm sound selection displays four modes: a default alarm sound, a smart recommended alarm sound, custom, and a manually selected alarm sound. For details about the default alarm sound, the smart recommended alarm sound, and the manually selected alarm sound, refer to the foregoing descriptions. Custom may be understood as that the user may edit to customize an alarm sound. In the example shown in FIG. 3b, the default alarm sound is enabled, and the remaining three modes are disabled.

If the user enables the manually selected alarm sound, that is, the user taps the start button of the manually selected alarm sound, the sub interface of the manually selected alarm sound is displayed, as shown in the example in FIG. 3b. In this example, the sub interface of the manually selected alarm sound includes four types of vehicle alarm sounds. The user may tap start buttons of different vehicles to select an alarm sound. In the example shown in FIG. 3b, vehicle 1 is enabled, and the remaining three vehicles are disabled.

It should be further noted that the electronic devices such as the mobile phones and the noise reduction headphones described above may further be provided with an alarm sound detection model. The alarm sound detection model has a function of predicting whether audio information that is input into the alarm sound detection model includes an alarm sound. The alarm sound detection model may be a basic network model such as a convolutional neural network (Convolutional Neural Network, CNN) or a long-short term memory (Long-Short Term Memory, LSTM).

The convolutional neural network usually includes: an input layer, a convolution layer (Convolution Layer), a pooling layer (Pooling layer), a fully connected layer (Fully Connected Layer, FC), and an output layer. Generally, the first layer of the convolutional neural network is the input layer, and the last layer is the output layer.

The convolution layer (Convolution Layer) is a neuron layer performing convolutional processing on the input signal of the convolutional neural network. One neuron on the convolution layer of the convolutional neural network may be connected to only neurons on some neighboring layers. One convolution layer usually includes several feature maps, and each feature map may include some neuron units arranged in a rectangle. Neuron units on a same feature map share a weight. The shared weight herein is a convolution kernel.

The pooling layer (Pooling layer) usually obtains features with great dimensions after the convolution layer. The features are divided into several areas, and a maximum value or an average value is calculated to obtain new features with smaller dimensions.

On the fully connected layer (Fully-Connected layer), all local features are combined into a global feature, which is used to calculate a score of the last category.

The long-short term memory (Long-Short Term Memory, LSTM) usually includes an input layer, a hidden layer, and an output layer. The input layer includes at least one input node. When the LSTM network is a one-way network, the hidden layer includes only a forward hidden layer. When the LSTM network is a two-way network, the hidden layer includes a forward hidden layer and a backward hidden layer. Each input node is separately connected to a forward hidden layer node and a backward hidden layer node, and is configured to separately output the input data to the forward hidden layer node and the backward hidden layer node. A hidden node on each hidden layer is connected to an output node, and is configured to output a calculation result of the hidden node to the output node. The output node performs calculation based on the output node of the hidden layer, and outputs data.

The alarm sound detection model may be trained in the following manner:

An original alarm sound detection model is created. The original alarm sound detection model may be a basic network model such as a CNN or an LSTM.

A large quantity of training samples are obtained. The training samples include samples that include alarm sounds and samples that do not include alarm sounds. In addition, whether a training sample includes an alarm sound is marked. The alarm sound in the training sample may be, for example, a whistle of a vehicle. Certainly, to enable the alarm sound detection model to predict more types of alarm sounds through training, training samples including whistles of different types of motor vehicles such as cars and motorcycles and training samples including other alarm sounds such as alarm bells can be obtained. The alarm bell can be understood as alarm sounds of special vehicles such as ambulances, police cars, and fire trucks.

The training samples are input into the original alarm sound detection model. The original alarm sound detection model detects whether the training samples include alarm sounds to obtain a detection result.

Loss values of the detection result and a marking result of each training sample are calculated by using a loss function to obtain a loss value of the model. In some embodiments, a loss value can be calculated by using a loss function such as a cross-entropy loss function or a weighted loss function, or a plurality of loss values may be calculated by using a combination of a plurality of loss functions.

Whether the loss value of the model meets a model convergence condition is determined.

In some embodiments, the model convergence condition may be that the loss value of the model is less than or equal to a preset loss threshold. To be specific, the loss value of the model may be compared with the loss threshold. If the loss value of the model is greater than the loss threshold, it may be determined that the loss value of the model does not meet the model convergence condition. On the contrary, if the loss value of the model is less than or equal to the loss threshold, it may be determined that the loss value of the model meets the model convergence condition.

It should be noted that for a plurality of training samples, a loss value of a model corresponding to each training sample may be calculated. In this case, the calculation is performed only when each the loss value of the model corresponding to each training sample meets the model convergence condition. On the contrary, a subsequent step is performed if a loss value of a model corresponding to any training sample does not meet the model convergence condition.

If the loss value of the model meets the model convergence condition, it indicates that the model training is completed. The trained model can be used for an audio information processing method proposed in the following embodiment to detect whether audio information that is input to the model includes an alarm sound.

If the loss value of the model does not meet the model convergence condition, calculation is performed based on the loss value of the model to obtain a parameter update value of the model, and the parameter update value of the model is used to update the original alarm sound detection model. The training sample is further processed by using the updated model to obtain a detection result. Next, subsequent steps are performed until the loss value of the model meets the model convergence condition.

It should be further noted that, in the embodiments of this application, a sound may be positioned based on an acoustic source localization algorithm of a microphone array or the like. In the acoustic source localization algorithm, a sound is positioned by using the microphone array. There are three main categories of commonly used acoustic source localization algorithms: a localization technology based on high-resolution spectral estimation, a localization technology based on steerable beamforming (Beamforming), and a localization technology based on TDOA.

A principle of the sound localization algorithm based on TDOA is simple. The sound localization algorithm based on TDOA is generally divided into two parts: delay estimation and sound source localization. An arrival time difference between two signals from different microphones can be calculated through delay estimation. An angle of a sound emitted by an acoustic source can be calculated through sound source localization based on the time difference.

Delay estimation algorithms mainly include a delay estimation method based on correlation analysis, a delay estimation method based on phase spectrum estimation, a delay estimation method based on parameter estimation. The most widely used method is mainly a generalized cross-correlation function (GCC) in the delay estimation method based on correlation analysis. The generalized cross-correlation function (GCC) in the delay estimation method based on correlation analysis introduces a weighting function to adjust a cross-power spectral density to optimize delay estimation performance. The generalized cross-correlation function may transform according to different weighting functions, and generalized cross correlation PHASE transformation (Generalized Cross Correlation PHASE Transformation, GCC-PHAT) is most widely used.

In a generalized cross-correlation function delay estimation algorithm, a delay is estimated based on a cross-correlation function peak of two microphone signals. In an acoustic source location system, target signals received by all array elements of the microphone array are from a same acoustic source. Therefore, all signals have a relatively strong correlation. Ideally, a delay between two microphone observation signals can be determined by calculating a correlation function between every two signals.

Signals $x_1(t)$ and $x_2(t)$ received by two microphones in the array are shown in formula 1:

$$x_1(t) = a_1 s(t - \tau_1) + n_1(t) \qquad \text{Formula 1}$$
$$x_2(t) = a_2 s(t - \tau_2) + n_2(t)$$

where t is a time, s(t) is an acoustic source signal, $n_1(t)$ and $n_2(t)$ are environment noises, $\tau_1$ and $\tau_2$ are times spent to transmit a signal from an acoustic source to two microphone array elements.

Figure 3C:
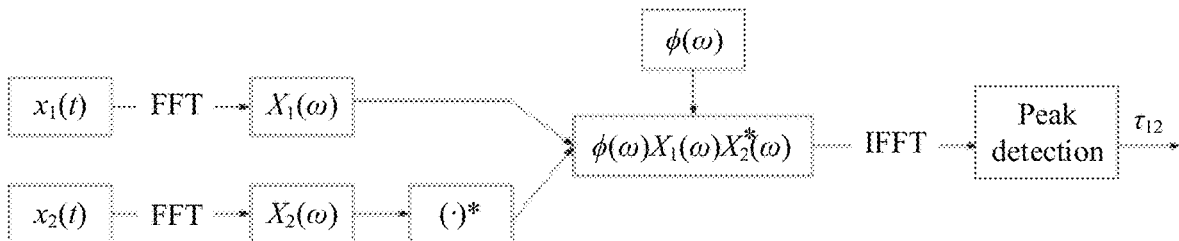
FIG. 3c is a principle diagram of a generalized cross-correlation delay estimation algorithm according to an embodiment of this application.

For the principle of the generalized cross-correlation delay estimation algorithm, refer to FIG. 3c.

In FIG. 3c, $X_1(\omega)$ is a result of performing Fourier transform FFT on $x_1(t)$, $X_2(\omega)$ is a result of performing Fourier transform FFT on $x_2(t)$, co is an angular frequency of a received signal of a microphone, (•)* indicates to perform conjugate processing on $X_2(\omega)$, and $\phi(\omega)$ is a phase transform weighting function and is used to perform phase transform and weighting on a conjugate of $X_1(\omega)$ and $X_2(\omega)$ to obtain a calculation result. Then, inverse Fourier transform IFFT is performed on the calculation result. Next, peak detection is performed on the calculation result, and $\tau_{12}$ is output by using a peak detection result.

$\tau_{12}=\tau_1-\tau_2$, representing a time difference between two microphone signals.

In GCC-PHAT, the signals of only two microphones are used. If there are more than two microphones, delay estimation may be performed by using another method. For example, for example, a steered response power-phase transform (Steered Response Power-Phase Transform, SRP-PHAT) algorithm based on phase transform weighting. The basic principle of the SRP-PHAT algorithm is to calculate a sum of generalized cross-correlation GCC-PHAT functions used to perform phase transform weighting on signals received by all microphones at a hypothetical acoustic source position. Acoustic source position estimation means to find the point that maximizes the SRP value in the entire acoustic source space.

Embodiment 1

Figure 4A:
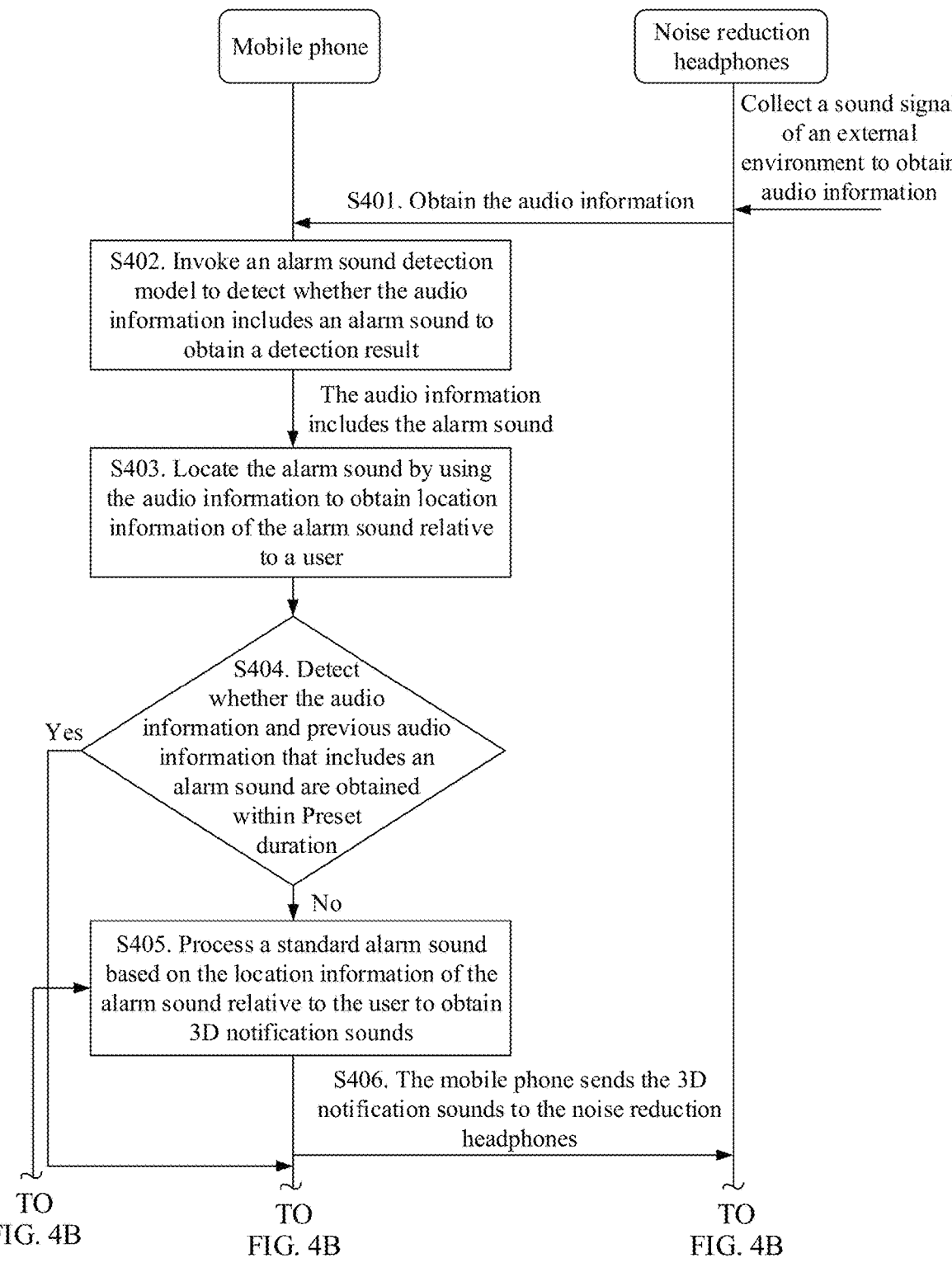

Based on the foregoing content, this embodiment further provides an audio information processing method. The audio information processing method provided in this embodiment may be applied to the application scenario in FIG. 1. As shown in FIG. 4A and FIG. 4B, the audio information processing method includes the following steps.

S401. A mobile phone obtains audio information.

The audio information is obtained by collecting sounds in an external environment, and the sounds in the external environment may be collected by using a microphone. In the application scenario shown in FIG. 1, a mobile phone and noise reduction headphones are all provided with a microphone. Therefore, the microphone in the mobile phone or the noise reduction headphones may collect the sounds in the external environment to obtain the audio information.

It should be further noted that after a headphone smart alarm sound function is enabled, when the noise reduction headphones are on, the mobile phone or the noise reduction headphones may collect the sounds in the external environment periodically or in real time to obtain the audio information.

The noise reduction headphones collect the sounds in the external environment to obtain the audio information, and may transmit the audio information to the mobile phone through a channel to the mobile phone such as a Bluetooth channel.

In this embodiment, an example in which the noise reduction headphones collect the sounds in the external environment to obtain the audio information, and the mobile phone obtains the audio information obtained by the noise reduction headphones and performs the following step is used for description.

S402. The mobile phone invokes an alarm sound detection model to detect whether the audio information includes the alarm sound to obtain a detection result, where the detection result is used to indicate whether the audio information includes the alarm sound.

As described above, the alarm sound detection model has a function of predicting whether audio information that is input into the alarm sound detection model includes an alarm sound. Therefore, after the audio information in the external environment is obtained, whether the audio information includes the alarm sound may be detected by using the alarm sound detection model to obtain the detection result.

In this embodiment, after obtaining the audio information, the mobile phone invokes the alarm sound detection model to detect whether the audio information includes the alarm sound to obtain the detection result.

In some other embodiments, the noise reduction headphones may alternatively invoke the alarm sound detection model to detect whether the audio information includes the alarm sound to obtain the detection result, and then transmit the detection result to the mobile phone. In this way, the mobile phone may not perform step S402.

If the detection result indicates that the audio information includes the alarm sound, step S403 and step S404 are performed. If the detection result indicates that the audio information does not include the alarm sound, step S401 is performed.

It should be noted that the alarm sound mentioned in this embodiment of this application may be understood as the alarm sound mentioned in the foregoing content, for example, whistles of various types of motor vehicles or alarm bells.

S403. The mobile phone locates the alarm sound by using the audio information to obtain location information of the alarm sound relative to a user.

Figure 5:
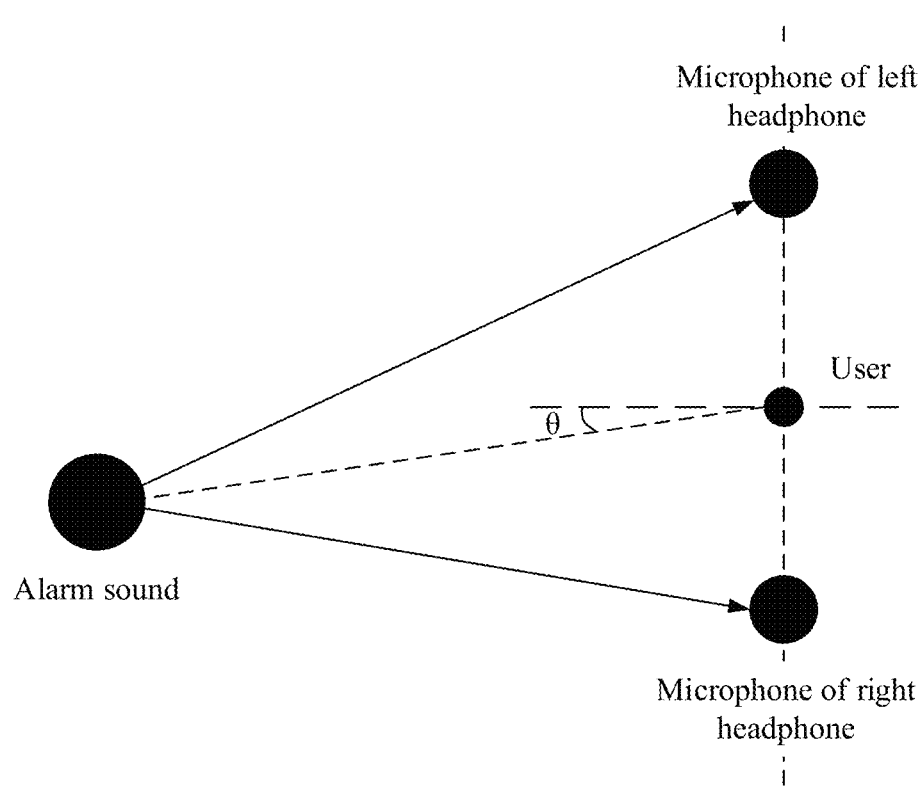
FIG. 5 is a schematic diagram of location information of an alarm sound relative to a user according to an embodiment of this application.

In this embodiment, by using the acoustic source localization algorithm of the microphone array provided above, the mobile phone may locate the acoustic source of the alarm sound by using the audio information. Specifically, the mobile phone locates the acoustic source of the alarm sound by using the audio information collected by the microphone of the left headphone of the noise reduction headphones and the audio information collected by the microphone of the right headphone to obtain the location information of the alarm sound relative to the user. The location information usually includes a horizontal direction angle θ of the alarm sound relative to the user. FIG. 5 shows an example of the horizontal direction angle θ of the alarm sound relative to the user (specifically, the center point of the user's head).

It should be noted that the mobile phone performs location by using the audio information collected by the headphones. Therefore, the location information of the alarm sound obtained in this step relative to the user is location information of the alarm sound relative to the headphones. Similarly, in the following content, all location information of the alarm sound relative to the user is the location information of the alarm sound relative to the headphones.

It should be further noted that the location information, obtained by using the acoustic source localization algorithm based on the microphone array, of the alarm sound relative to the user may be understood as relative location information of the alarm sound. Certainly, in step S403, the mobile phone locates the alarm sound by using the audio information to obtain the location information of the alarm sound relative to the user or an absolute location of the alarm sound.

In some other embodiments, the noise reduction headphones may locate the acoustic source of the alarm sound by using the audio information collected by the microphone of the left headphone, the audio information collected by the microphone of the right headphone, and the acoustic source localization algorithm based on the microphone array described above, to obtain the location information of the alarm sound relative to the user. The noise reduction headphones can transmit the direction angle of the alarm sound relative to the user to the mobile phone. In this way, the mobile phone may not perform step S403.

It should be further noted that the microphone of the mobile phone can also collect sounds in the external environment to obtain audio information. Therefore, in some other embodiments of this application, the mobile phone can obtain the audio information collected by the microphone array embedded in the mobile phone, and locate the acoustic source of the alarm sound by using the audio information collected by the microphone array to obtain the location information of the alarm sound relative to the mobile phone.

A relative angle may exist between the mobile phone and the user. Therefore, after obtaining the location information of the alarm sound relative to the mobile phone by using the audio information collected by the microphone array of the mobile phone, the mobile phone further needs to perform coordinate transformation on the location information of the alarm sound relative to the mobile phone to obtain the location information of the alarm sound relative to the user.

The coordinate transformation may be performed on the location information of the alarm sound relative to the mobile phone based on a same coordinate system of the mobile phone and the noise reduction headphones to obtain the location information of the alarm sound relative to the user. In some embodiments, the mobile phone and the noise reduction headphones are known relatively to the Geodetic coordinate system. Therefore, coordinate transformation may be performed on the location information of the alarm sound relative to the mobile phone based on the Geodetic coordinate system to obtain the location information of the alarm sound relative to the user. Certainly, coordinate transformation may alternatively be performed based on a unified coordinate system of other mobile phones and noise reduction headphones.

To adapt to coordinate transformation, the noise reduction headphones need to calculate an attitude angle relative to the Geodetic coordinate system. Therefore, an acceleration sensor and an angular velocity sensor need to be disposed in the noise reduction headphones. Usually, the acceleration sensor and the angular velocity sensor that are to be disposed need to be of the same category of the mobile phone.

Specifically, the mobile phone calculates the attitude angle of the mobile phone by using detection data of the acceleration sensor and the angular velocity sensor of the mobile phone. The noise reduction headphones calculate the attitude angles of the headphones by using detection data of the acceleration sensors and the angular velocity sensors of the noise reduction headphones. The mobile phone obtains the attitude angles of the headphones, determines a transformation relationship between coordinate systems of the headphones and the mobile phone by using the attitude angle of the mobile phone and the attitude angles of the headphones, and processes the location information of the alarm sound relative to the mobile phone by using the transformation relationship, to obtain the location information of the alarm sound relative to the user.

It should be noted that for a specific manner in which the mobile phone and the noise reduction headphones perform, by using the detection data of the acceleration sensors and the angular velocity sensors thereof, calculation to obtain the attitude angles, refer to a normal manner. Details are not described herein. Similarly, for a manner in which the mobile phone determines the transformation relationship between the coordinate systems of the headphones and the mobile phone by using the attitude angle of the mobile phone and the attitude angles of the headphones, and processes the location information of the alarm sound relative to the mobile phone by using the transformation relationship, to obtain the location information of the alarm sound relative to the user, also refer to a normal manner. Details are not described herein.

It should be further noted that, in some other embodiments of this application, the mobile phone obtains the audio information collected by the microphone array embedded in the mobile phone, and transmits the obtained audio information to the noise reduction headphones. The noise reduction headphones locate the alarm sound by using the audio information to obtain location information of the alarm sound relative to a user.

Specifically, the microphone array of the mobile phone collects the audio information in the external environment. Therefore, when the noise reduction headphones locate the acoustic source of the alarm sound by using the audio information and the acoustic source localization algorithm based on the microphone array described above, the location information of the alarm sound relative to the mobile phone is obtained. The noise reduction headphones further perform coordinate transformation on the location information of the alarm sound relative to the mobile phone by using the foregoing content to obtain the location information of the alarm sound relative to the user.

S404. The mobile phone detects whether the audio information and previous audio information that includes an alarm sound are obtained within preset duration.

If the mobile phone detects that the audio information and the previous audio information that includes the alarm sound are not obtained within the preset duration, steps S405 to S407 are performed. If the mobile phone detects that the audio information and the previous audio information that includes the alarm sound are obtained within the preset duration, steps S408 to S413 are performed.

The mobile phone periodically obtains the audio information. Therefore, the previous audio information that includes the alarm sound is the last audio information that includes an alarm sound and that is determined by the mobile phone during alarm sound detection before the mobile phone determines the current audio information that includes the alarm sound.

If the mobile phone detects that the audio information and the previous audio information that includes the alarm sound are obtained within the preset duration, it indicates that the mobile phone detects two consecutive alarm sounds within same duration. Therefore, the user may need to be notified of the alarm sound particularly.

It should be noted that the preset duration may be set based on an actual requirement. Because two consecutive alarm sounds need to be filtered out through step S404, the preset duration should not be too long. In an example, the preset duration may be set to 30 seconds.

S405. The mobile phone processes a standard alarm sound based on the location information of the alarm sound relative to the user to obtain 3D notification sounds.

The 3D notification sound may be understood as an alarm sound carrying a direction. The standard alarm sound may be processed by using a 3D sound technology to obtain the alarm sound carrying the direction. After the alarm sound carrying the direction is output to the user, the user can feel the direction of the alarm sound.

It should be noted that, in this embodiment, a plurality of standard alarm sounds are pre-stored in the mobile phone, and the user may preset, in the alarm sound selection manner provided in the foregoing content, a standard alarm sound for playing an alarm notification. Certainly, before this step is performed, the mobile phone may display the alarm sound selection interface shown in FIG. 3b to remind the user to set the standard alarm sound.

The standard alarm sound may be understood as an alarm sound that does not include any noise, and usually may be whistle of a vehicle.

In some embodiments, a plurality of head-related transfer function (Head-Response Transfer Function, HRTF) values are further pre-stored in the mobile phone. The head-related transfer function (Head-Response Transfer Function, HRTF) values are usually set in pairs based on left and right headphones. To be specific, the plurality of HRTF values are divided into a plurality of HRTF values for the left headphone and a plurality of HRTF values for the right headphone that are in a one-to-one correspondence with the HRTF values of the left headphone. HRTF values of one pair of left and right headphones correspond to one angle of one alarm sound relative to the user.

Usually, the human head may be used as the center point, and 360° at a distance from the center point may be divided into a plurality of angle values. For each angle value, two corresponding head-related transfer function (Head-Response Transfer Function, HRTF) values are set. One HRTF value corresponds to the left headphone, and the other HRTF value corresponds to the right headphone. The 360° around the center point may be equally divided into a plurality of angles. In addition, a quantity of angles obtained through division may be set based on an actual condition.

The head-related transfer function (Head-Response Transfer Function, HRTF) is a sound localization processing technology, which is a human ear perception model obtained through statistics collection and calculation by measuring transformation data of the human ear to different directions of sounds.

In this embodiment, a calculation manner for the head-related transfer function (Head-Response Transfer Function, HRTF) value is shown in formula 2:

$$H_L = H_L(r, \theta, \phi, f, a) = \frac{P_L(r, \theta, \phi, f, a)}{P_0(r, f)} \qquad \text{Formula 2}$$

$$H_R = H_R(r, \theta, \phi, f, a) = \frac{P_R(r, \theta, \phi, f, a)}{P_0(r, f)}$$

where $P_L$ and $P_R$ are respectively complex sound pressures generated by an acoustic source in the left and right ears in frequency domain; and $P_0$ is a sound pressure generated by the acoustic source in frequency domain at the head center after the human head moves away, and the definition of $P_0$ is shown in formula 3:

$$P_0(r, f) = j\frac{k\rho_o c Q_0}{4\pi r}\exp(-jkr) \qquad \text{Formula 3}$$

where $\rho_0$ is a density of a medium (air); c is a sound speed, and c in air is 344 m/s at room temperature; $Q_0$ is acoustic source strength; $k=2\pi f/c$ is a quantity of sound waves; r is a relative distance from the acoustic source to a human, for example, 1.5 m; and f is a sound frequency.

Based on the foregoing content, a possible implementation of this step includes:

obtaining the standard alarm sound that is set by the user; and obtaining an HRTF value of the left headphone and an HRTF value of the right headphone by using location information of the alarm sound relative to the user, where the two HRTF values correspond to the location information.

In some embodiments, the location information of the alarm sound relative to the user includes a horizontal direction angle of the alarm sound relative to the user. The horizontal direction angle of the alarm sound relative to the user is used as a filtering factor to filter a plurality of HRTF values stored in the mobile phone to obtain the HRTF value of the left headphone and the HRTF value of the right headphone that match the horizontal direction angle of the alarm sound relative to the user.

Fourier transform multiplication is separately performed between the standard alarm sound and the HRTF value of the left headphone and the HRTF value of the right headphone that correspond to the location information to obtain output signals of two ears, to be specific, a 3D notification sound of the left headphone and a 3D notification sound of the right headphone.

In some other embodiments, a plurality of head-related impulse response (Head Related Impulse Response, HRIR) values may further be pre-stored in the mobile phone. The plurality of head-related impulse response (Head Related Impulse Response, HRIR) values are usually set in pairs based on left and right headphones. To be specific, the plurality of HRIR values are divided into a plurality of HRIR values for the left headphone and a plurality of HRIR values for the right headphone that are in a one-to-one correspondence with the HRIR values of the left headphone. HRIR values of one pair of left and right headphones correspond to one angle of one alarm sound relative to the user.

A head-related impulse response (Head Related Impulse Response, HRIR) is a time domain signal, and a head-related transfer function (Head-Response Transfer Function, HRTF) is a frequency domain signal corresponding to the HRIR.

Based thereupon, another possible implementation of this step includes:

obtaining the standard alarm sound that is set by the user; and obtaining an HRIR value of the left headphone and an HRIR value of the right headphone by using location information of the alarm sound relative to the user, where the two HRIR values correspond to the location information.

In some embodiments, the location information of the alarm sound relative to the user includes a horizontal direction angle of the alarm sound relative to the user. The horizontal direction angle of the alarm sound relative to the user is used as a filtering factor to filter a plurality of HRIR values stored in the mobile phone to obtain the HRIR value of the left headphone and the HRIR value of the right headphone that match the horizontal direction angle of the alarm sound relative to the user.

Convolutional processing is separately performed between the standard alarm sound and the HRIR value of the left headphone and the HRIR value of the right headphone that correspond to the location information to obtain output signals of two ears, to be specific, a 3D notification sound of the left headphone and a 3D notification sound of the right headphone.

It should be further noted that the foregoing location information of the alarm sound relative to the user may be completely the same as or similar to the location information of the alarm sound relative to the user obtained in step S403, or a difference between the two is very small.

S406. The mobile phone sends the 3D notification sounds to the noise reduction headphones.

In some embodiments, the mobile phone may send a 3D notification sound to the left headphone of the noise reduction headphones and send a 3D notification sound to the right headphone of the noise reduction headphones through a connection channel such as Bluetooth.

S407. The noise reduction headphones play the 3D notification sounds.

The left headphone of the noise reduction headphones outputs the 3D notification sound of the left headphone, and the right headphone of the noise reduction headphones outputs the 3D notification sound of the right headphone.

In this embodiment, when detecting an alarm sound from audios in the external environment, the mobile phone locates the alarm sound by using the audio information to obtain the location information of the alarm sound relative to the user, and processes the standard alarm sound based on the location information of the alarm sound relative to the user to obtain the 3D notification sounds. Then, the noise reduction headphones play the 3D notification sounds to notify the user that the alarm sound appears around and a safety problem exists.

S408. The mobile phone determines whether a difference between the location information of the alarm sound relative to the user in the audio information and location information of an alarm sound relative to the user in previous audio information that includes an alarm sound is within a preset range.

If the mobile phone determines that the difference between the location information of the alarm sound relative to the user in the audio information and the location information of the alarm sound relative to the user in the previous audio information that includes the alarm sound is not within the preset range, step S405 is performed.

If the mobile phone determines that the difference between the location information of the alarm sound relative to the user in the audio information and the location information of the alarm sound relative to the user in the previous audio information that includes the alarm sound is within the preset range, step S409 is performed.

If the difference between the location information of the alarm sound relative to the user in the audio information and the location information of the alarm sound relative to the user in the previous audio information that includes the alarm sound is within the preset range, it indicates that two alarm sounds appear successively in the same range, and the user needs to be notified of the alarm sound particularly.

The preset range may be set based on an actual condition. Generally, a difference between horizontal direction angles of alarm sounds relative to the user is set to less than a first threshold. Certainly, the first threshold may be set based on an actual condition. In an example, the first threshold may be 5°.

S409. The mobile phone detects whether the audio information and the previous audio information that includes the alarm sound are a same sound.

In some embodiments, that the mobile phone detects whether the audio information and the previous audio information that includes the alarm sound are a same sound means that the mobile phone detects whether the alarm sound in the audio information and the alarm sound in the previous audio information that includes the alarm sound are a same alarm sound.

In this step, manners for detecting whether the alarm sound in the audio information and the alarm sound in the previous audio information that includes the alarm sound are a same alarm sound may include the following two manners.

In a first manner, whether the audio information and the previous audio information that includes the alarm sound are a same sound is detected.

In a second manner, an alarm sound is separately extracted from the audio information and the previous audio information that includes the alarm sound, and whether the two extracted alarm sounds are a same alarm sound is determined.

When the alarm sound detection model detects that the audio information includes the alarm sound, the alarm sound detection model may obtain the location information of the alarm sound in the audio information. Therefore, the alarm sounds may be extracted, by using the location information of the alarm sound, from the audio information and the previous audio information that includes the alarm sound.

The first manner is used as an example below to specifically describe the process of detecting whether the alarm sound in the audio information and the alarm sound in the previous audio information that includes the alarm sound are a same alarm sound. Certainly, in the second manner, for a manner of determining whether two alarm sounds are a same alarm sound, also refer to the following content.

It should be further noted that the strength of two alarm sounds may be different, but if the two alarm sounds are from a same acoustic source, frequencies of the alarm sounds should be the same. Therefore, in a possible implementation, whether two pieces of successive audio information including alarm sounds are a same sound can be determined by using an amplitude spectrum. A specific implementation is as follows:

obtaining two pieces of successive audio information including alarm sounds; and separately performing time domain to frequency domain conversion on each piece of audio information including an alarm sound to obtain an amplitude spectrum of the audio information including the alarm sound. Fourier transform may be performed on the audio information including the alarm sound to obtain the amplitude spectrum of the audio information.

It should be noted that the x-axis of the amplitude spectrum represents a frequency, and the y-axis of the amplitude spectrum is an amplitude of the audio information. An energy distribution at a specified frequency can be viewed by using the amplitude spectrum.

Similarity calculation is performed on two pieces of successive audio information by using amplitude spectra of the two pieces of successive audio information including the alarm sounds to obtain a calculation result. The calculation result is used to represent whether the two pieces of successive audio information are a same sound.

In some embodiments, similarity calculation may be performed on two pieces of successive audio information including alarm sounds by using a Pearson correlation function to obtain a similarity.

Specifically, sampling point collection is performed on the two pieces of successive audio information including the alarm sounds to obtain n sampling points of each piece of audio information including an alarm sound. The sampling points of the two pieces of successive audio information including the alarm sounds may be referred to as $(X_i, Y_i)$. A Pearson correlation coefficient r can be calculated by substituting the sampling points of the two pieces of successive audio information including the alarm sounds into the following formula 4.

$$r = \frac{\sum_{i=1}^{n}(X_i - \bar{X})(Y_i - \bar{Y})}{\sqrt{\sum_{i=1}^{n}(X_i - \bar{X})^2}\sqrt{\sum_{i=1}^{n}(Y_i - \bar{Y})^2}} \qquad \text{Formula 4}$$

After the Pearson correlation coefficient r is calculated, correlation strength of the two pieces of successive audio information including the alarm sounds can be determined by using Table 1.

TABLE 1

| r | Correlation strength |
|---|---|
| 0.8 to 1.0 | Extremely high correlation |
| 0.6 to 0.8 | High correlation |
| 0.4 to 0.6 | Medium correlation |
| 0.2 to 0.4 | Low correlation |
| 0.0 to 0.2 | Extremely low correlation |

It should be noted that a threshold may be set based on a relationship between the Pearson correlation coefficient r and the correlation strength provided in Table 1. For example, the threshold is set to 0.8. If the similarity between the two pieces of successive audio information including the alarm sounds is greater than the threshold, the two pieces of successive audio information including the alarm sounds are a same sound. If the similarity between the two pieces of successive audio information including the alarm sounds is not greater than the threshold, the two pieces of successive audio information including the alarm sounds are not a same sound.

In some other embodiments, whether two pieces of audio information are a same sound may be predicted by using a classification model, for example, a binary classification model, a SOM model, or an SVM model. In this embodiment, for a training process of the classification model, refer to the content of the alarm sound detection model provided above. Details are not described herein again.

The classification model obtained through training can predict a classification result indicating whether two input signals, for example, the two pieces of successive audio information including the alarm sounds in this embodiment, that are input into the classification model are of a same category, to obtain a prediction result. In an example, if the prediction result is 1, the two pieces of successive audio information including the alarm sounds are a same sound; if the prediction result is 0, the two pieces of successive audio information including the alarm sounds are not a same sound.

If it is detected that the audio information and the previous audio information that includes the alarm sound are a same sound, step S410 is performed. If it is detected that the audio information and the previous audio information that includes the alarm sound are not a same sound, step S405 is performed.

It should be further noted that if the mobile phone detects that the audio information and the previous audio information that includes the alarm sound are a same sound, it indicates that two consecutive alarm sounds of a same acoustic source appear in a same direction of the user. Therefore, the user may need to be notified of the alarm sound particularly.

It should be further noted that an execution order of step S403, step S404, step S408, and step S409 is not limited to that shown in FIG. 4A and FIG. 4B, and these steps may be performed in parallel. In addition, an execution order of step S404, step S408, and step S409 is not limited to that shown in FIG. 4A and FIG. 4B either, and these steps may be performed in parallel or in another execution order.

S410. The mobile phone generates a distance coefficient, where the distance coefficient is used to represent an energy gain of the audio information relative to the previous audio information that includes the alarm sound.

It should be noted that if an energy value of the audio information is greater than an energy value of the previous audio information that includes the alarm sound, the energy gain is positive, that is, the distance coefficient is a value greater than 1; if an energy value of the audio information is less than an energy value of the previous audio information that includes the alarm sound, the energy gain is negative, that is, the distance coefficient is a value less than 1; or if an energy value of the audio information is equal to an energy value of the previous audio information that includes the alarm sound, the energy gain is 0, that is, the distance coefficient is 1.

In some embodiments, it is assumed that an energy value of audio information is $z_1$, and an energy value of next audio information that includes an alarm sound is $z_2$, the distance coefficient gain may be calculated by using formula 5.

$$gain = \log(z_2 + k)/\log(z_1 + k) \qquad \text{Formula 5}$$

In the formula, k is a constant.

It should be further noted that a range of the distance coefficient may be set in advance, for example, may be 0.1 to 10. After the distance coefficient is calculated in step S410, whether the distance coefficient is with the range of the distance coefficient is determined. If the distance coefficient is within the range of the distance coefficient, the following step is performed. If the distance coefficient is out of the range of the distance coefficient, an endpoint value of the range of the distance coefficient (to be specific, a maximum value or a minimum value of the range of the distance coefficient) is used as the distance coefficient in this step to perform the following step. Certainly, an endpoint value closest to the to-be-generated distance coefficient is used as the distance coefficient in this step to perform the following step.

When the distance coefficient generated in step S410 exceeds the range of the distance coefficient, an endpoint value of the range of the distance coefficient is used as the distance coefficient in this step to perform the following step. In this way, extremely high or low volume, caused by an extremely large or small generated distance coefficient, of playing a 3D notification sound with an energy gain can be avoided.

S411. The mobile phone processes a standard alarm sound based on the location information of the alarm sound relative to the user and the distance coefficient to obtain 3D notification sounds with energy gains.

In this step, manners for obtaining the standard alarm sound and determining the HRTF value and the HRIR value are same as those in step S405. Details are not described herein again.

In a possible implementation, Fourier transform is performed on the standard alarm sound. Then, multiplication is separately performed between the standard alarm sound and the HRTF value of the left headphone and the HRTF value of the right headphone that correspond to the location information to obtain output signals of two ears, to be specific, a 3D notification sound of the left headphone and a 3D notification sound of the right headphone. Next, the 3D notification sound of the left headphone and the 3D notification sound of the right headphone are separately multiplied by the distance coefficient gain to obtain 3D notification sounds, carrying energy gains, of the left and right headphones.

In another possible implementation, convolutional processing is separately performed between the standard alarm sound and the HRIR value of the left headphone and the HRIR value of the right headphone that correspond to the location information to obtain output signals of two ears, to be specific, a 3D notification sound of the left headphone and a 3D notification sound of the right headphone. Then, the 3D notification sound of the left headphone and the 3D notification sound of the right headphone are separately multiplied by the distance coefficient gain to obtain 3D notification sounds, carrying energy gains, of the left and right headphones.

In this embodiment, the mobile phone processes the standard alarm sound to obtain the 3D notification sounds with the energy gains. If the acoustic source of the alarm sound keeps approaching the user, an energy value of audio information currently obtained by the mobile phone is greater than an energy value previously obtained the audio information. Therefore, the energy gain is positive, the distance coefficient is greater than 1, and an energy value of the 3D notification sound with the energy gain is greater than an energy value of a previous 3D notification sound, ensuring that the 3D notification sound with the energy gain particularly notifies the user.

S412. The mobile phone sends the 3D notification sounds with the energy gains to the noise reduction headphones.

In some embodiments, the mobile phone may send a 3D notification sound with an energy gain to the left headphone of the noise reduction headphones and send a 3D notification sound with an energy gain to the right headphone of the noise reduction headphones through a connection channel such as Bluetooth.

S413. The noise reduction headphones play the 3D notification sounds with the energy gains.

The left headphone of the noise reduction headphones outputs the 3D notification sound with the energy gain of the left headphone, and the right headphone of the noise reduction headphones outputs the 3D notification sound with the energy gain of the right headphone.

It should be noted that step S404 and step S408 to step S413 are optional steps. In some embodiments, if the user needs to be notified, by using the noise reduction headphones, of an alarm sound appearing in the environment in which the user is located, step S404 and step S408 to step S413 may not be performed. Step S405 to step S407 are performed after step S403 is performed.

It should be further noted that the audio information processing method provided in Embodiment 1 may alternatively be performed by the noise reduction headphones.

In some embodiments, the noise reduction headphones completely replace the mobile phone to completely perform the audio information processing method shown in FIG. 4A and FIG. 4B. That is, after the headphone smart alarm sound function is enabled, during operation, the noise reduction headphones collect sounds in an external environment by using microphones of the noise reduction headphones to obtain audio information, and perform step S402 to step S405, step S407 to step S411, and step S413 by using the audio information.

In some other embodiments, the headphone smart alarm sound function is enabled, and the microphone array of the mobile phone collects the sounds in the external environment to obtain the audio information. The noise reduction headphones perform step S402 to step S405, step S407 to step S411, and step S413 by using the audio information.

Embodiment 2

Figure 6:
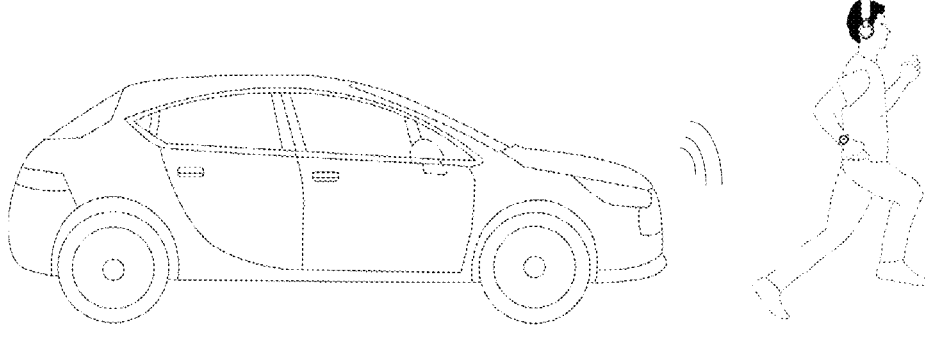
FIG. 6 is a diagram of another application scenario according to an embodiment of this application.

Refer to FIG. 6. In another application scenario provided in this embodiment, a user wears noise reduction headphones on the head and wears a smart watch on the wrist, and a mobile phone establishes a Bluetooth connection separately to the smart watch and the noise reduction headphones. In this application scenario, the noise reduction headphones can also exchange information with the smart watch through a connection channel such as the Bluetooth, so that when an alarm sound indicating danger appears around the user, the noise reduction headphones can notify the user.

It should be noted that for basic components and software structures of the noise reduction headphones and the smart watch, refer to the foregoing content. Details are not described herein again.

Figure 7A:
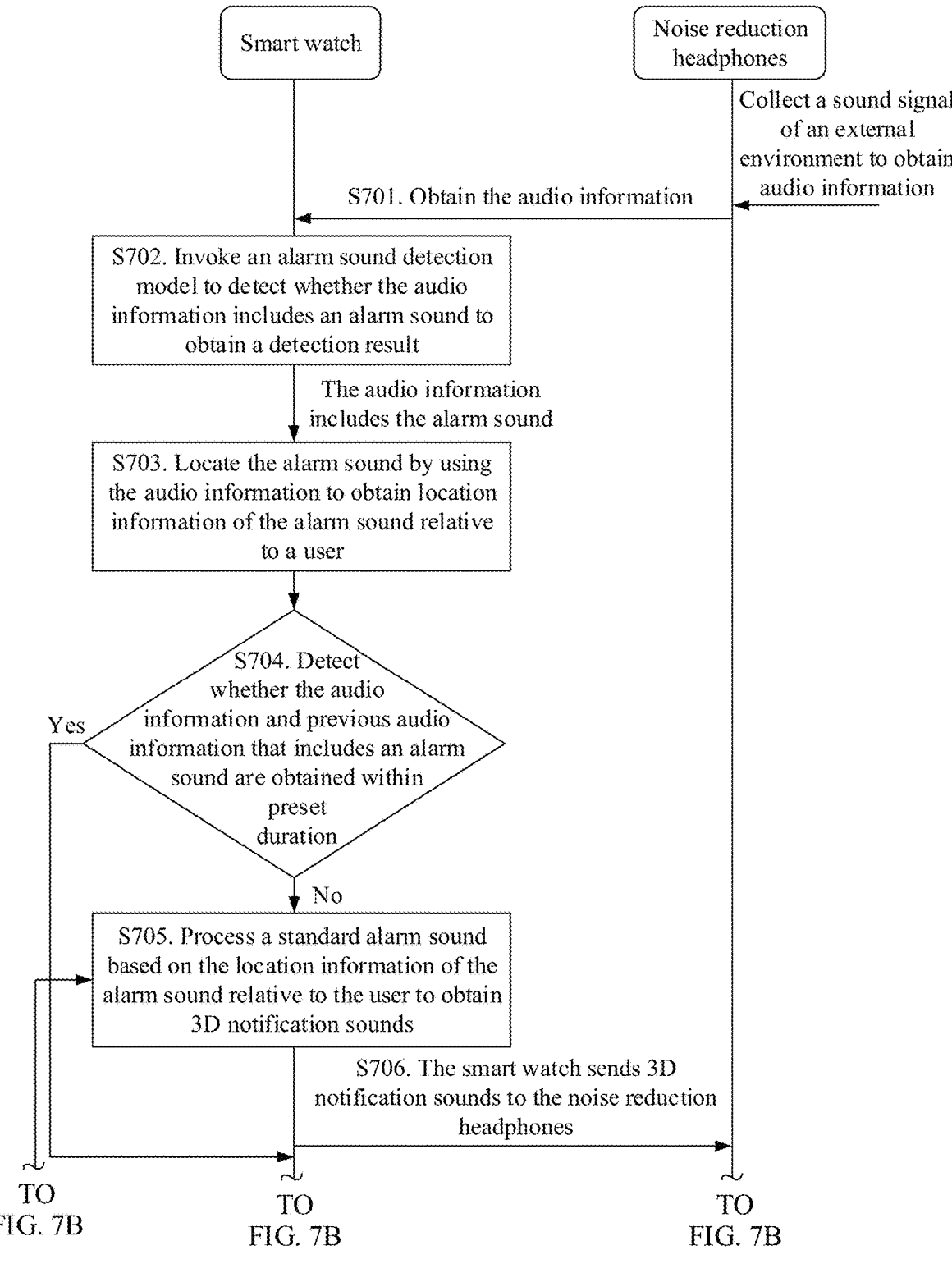

For an audio information processing method provided in this embodiment, refer to FIG. 7A and FIG. 7B. The method includes the following steps.

S701. The smart watch obtains audio information obtained by the noise reduction headphones.

Microphones of the noise reduction headphones collect sounds in an external environment to obtain the audio information, and the smart watch may obtain the audio information through a Bluetooth channel or the like.

In some embodiments, the noise reduction headphones may transmit the audio information to the smart watch through the Bluetooth channel or the like. Then, the smart watch transmits the audio information to the smart watch through the Bluetooth channel.

In some other embodiments, the noise reduction headphones may transmit the audio information to the smart watch through the Bluetooth channel or the like.

S702. The smart watch invokes an alarm sound detection model to detect whether the audio information includes the alarm sound to obtain a detection result, where the detection result is used to indicate whether the audio information includes the alarm sound.

As described above, the alarm sound detection model has a function of predicting whether audio information that is input into the alarm sound detection model includes an alarm sound. Therefore, after obtaining the audio information in the external environment, the smart watch may detect, by using the alarm sound detection model, whether the audio information includes the alarm sound. In this embodiment, the smart watch pre-stores a trained alarm sound detection model. After obtaining the audio information, the smart watch invokes the alarm sound detection model to detect whether the audio information includes the alarm sound to obtain the detection result.

In some other embodiments, the noise reduction headphones may alternatively invoke the alarm sound detection model to detect whether the audio information includes the alarm sound to obtain the detection result, and then transmit the detection result to the smart watch. In this way, the smart watch may not perform step S702.

If the detection result indicates that the audio information includes the alarm sound, step S703 and step S704 are performed. If the detection result indicates that the audio information does not include the alarm sound, step S701 is performed.

S703. The smart watch locates the alarm sound by using the audio information to obtain location information of the alarm sound relative to a user.

In this embodiment, by using the acoustic source localization algorithm of the microphone array provided above, the smart watch may locate the acoustic source of the alarm sound by using the audio information. Specifically, the smart watch locates the acoustic source of the alarm sound by using the audio information collected by the microphone of the left headphone of the noise reduction headphones and the audio information collected by the microphone of the right headphone to obtain the location information of the alarm sound relative to the user. The location information usually includes a horizontal direction angle θ of the alarm sound relative to the user.

In some other embodiments, the noise reduction headphones may locate the acoustic source of the alarm sound by using the audio information collected by the microphone of the left headphone, the audio information collected by the microphone of the right headphone, and the acoustic source localization algorithm based on the microphone array described above, to obtain the location information of the alarm sound relative to the user. The noise reduction headphones can transmit the direction angle of the alarm sound relative to the user to the smart watch. In this way, the smart watch may not perform step S703.

It should be further noted that the microphone of the mobile phone can also collect sounds in the external environment to obtain audio information. Therefore, in some other embodiments of this application, the smart watch can obtain, through, for example, the Bluetooth channel, the audio information collected by the microphone array embedded in the mobile phone. The smart watch locates the acoustic source of the alarm sound by using the audio information collected by the microphone array to obtain the location information of the alarm sound relative to the user.

For a manner in which the smart watch locates the acoustic source of the alarm sound by using the audio information collected by the microphone array of the mobile phone to obtain the location information of the alarm sound relative to the user, refer to the content of step S403 in Embodiment 1. Details are not described herein again.

S704. The smart watch detects whether the audio information and previous audio information that includes an alarm sound are obtained within preset duration.

If the smart watch detects that the audio information and the previous audio information that includes the alarm sound are not obtained within the preset duration, steps S705 to S707 are performed. If the smart watch detects that the audio information and the previous audio information that includes the alarm sound are obtained within the preset duration, steps S708 to S713 are performed.

S705. The smart watch processes a standard alarm sound based on the location information of the alarm sound relative to the user to obtain 3D notification sounds.

It should be noted that the user may preset, in the alarm sound selection manner provided in the foregoing content, a standard alarm sound for playing an alarm notification. Certainly, before this step is performed, the mobile phone may display the alarm sound selection interface shown in FIG. 3*b* to remind the user to set the standard alarm sound.

In some embodiments, a plurality of head-related transfer function (Head-Response Transfer Function, HRTF) values are further pre-stored in the smart watch. The head-related transfer function (Head-Response Transfer Function, HRTF) values are usually set in pairs based on left and right headphones. To be specific, the plurality of HRTF values are divided into a plurality of HRTF values for the left headphone and a plurality of HRTF values for the right headphone that are in a one-to-one correspondence with the HRTF values of the left headphone. HRTF values of one pair of left and right headphones correspond to one angle of one alarm sound relative to the user.

In some other embodiments, a plurality of head-related impulse response (Head Related Impulse Response, HRIR) values may further be pre-stored in the smart watch. The plurality of head-related impulse response (Head Related Impulse Response, HRIR) values are usually set in pairs based on left and right headphones. To be specific, the plurality of HRIR values are divided into a plurality of HRIR values for the left headphone and a plurality of HRIR values for the right headphone that are in a one-to-one correspondence with the HRIR values of the left headphone. HRIR values of one pair of left and right headphones correspond to one angle of one alarm sound relative to the user.

For a manner in which the smart watch performs step S705 and processes the standard alarm sound to obtain the 3D notification sound, refer to the two possible implementations of step S405 in Embodiment 1. Details are not described herein again.

S706. The smart watch sends the 3D notification sounds to the noise reduction headphones.

In some embodiments, the smart watch sends a 3D notification sound to the left headphone of the noise reduction headphones and sends a 3D notification sound to the right headphone of the noise reduction headphones.

In some other embodiments, the smart watch sends a 3D notification sound to the left headphone of the noise reduction headphones and sends a 3D notification sound to the right headphone of the noise reduction headphones through the mobile phone.

S707. The noise reduction headphones play the 3D notification sounds.

The left headphone of the noise reduction headphones outputs the 3D notification sound of the left headphone, and the right headphone of the noise reduction headphones outputs the 3D notification sound of the right headphone.

In this embodiment, when detecting an alarm sound from audios in the external environment, the smart watch locates the alarm sound by using the audio information to obtain the location information of the alarm sound relative to the user, and processes the standard alarm sound based on the location information of the alarm sound relative to the user to obtain the 3D notification sounds. Then, the noise reduction headphones play the 3D notification sounds to notify the user that the alarm sound appears around and a safety problem exists.

S708. The smart watch determines whether a difference between the location information of the alarm sound relative to the user in the audio information and location information of an alarm sound relative to the user in previous audio information that includes an alarm sound is within a preset range.

If the smart watch determines that the difference between the location information of the alarm sound relative to the user in the audio information and the location information of the alarm sound relative to the user in the previous audio information that includes the alarm sound is not within the preset range, step S705 is performed.

If the smart watch determines that the difference between the location information of the alarm sound relative to the user in the audio information and the location information of the alarm sound relative to the user in the previous audio information that includes the alarm sound is within the preset range, step S709 is performed.

For a specific process in which the smart watch performs step S708, refer to the content of step S408 in Embodiment 1. Details are not described herein again.

S709. The smart watch detects whether the audio information and the previous audio information that includes the alarm sound are a same sound.

For an implementation in which the smart watch detects whether the audio information and the previous audio information that includes the alarm sound are a same sound, refer to the content of step S409 in Embodiment 1. Details are not described herein again.

If the smart watch detects that the audio information and the previous audio information that includes the alarm sound are a same sound, step S710 is performed. If it is detected that the audio information and the previous audio information that includes the alarm sound are not a same sound, step S705 is performed.

S710. The smart watch generates a distance coefficient, where the distance coefficient is used to represent an energy gain of the audio information relative to the previous audio information that includes the alarm sound.

For an implementation in which the smart watch generates the distance coefficient, refer to the content of step S410 in Embodiment 1. Details are not described herein again.

S711. The smart watch processes a standard alarm sound based on the location information of the alarm sound relative to the user and the distance coefficient to obtain 3D notification sounds with energy gains.

For an implementation in which the smart watch processes the standard alarm sound based on the location information of the alarm sound relative to the user and the distance coefficient to obtain the 3D notification sounds with the energy gains, refer to the content of step S411 in Embodiment 1. Details are not described herein again.

S712. The smart watch sends the 3D notification sounds with the energy gains to the noise reduction headphones.

In some embodiments, the smart watch sends a 3D notification sound with an energy gain to the left headphone of the noise reduction headphones and sends a 3D notification sound with an energy gain to the right headphone of the noise reduction headphones.

In some other embodiments, the smart watch sends a 3D notification sound with an energy gain to the left headphone of the noise reduction headphones and sends a 3D notification sound with an energy gain to the right headphone of the noise reduction headphones through the mobile phone.

S713. The noise reduction headphones play the 3D notification sounds with the energy gains.

The left headphone of the noise reduction headphones outputs the 3D notification sound with the energy gain of the left headphone, and the right headphone of the noise reduction headphones outputs the 3D notification sound with the energy gain of the right headphone.

Another embodiment of this application further provides a computer-readable storage medium. The computer-readable storage medium stores instructions. When the instructions are run on a computer or processor, the computer or processor is enabled to perform one or more steps in any one of the foregoing methods.

Another embodiment of this application further provides a computer program product including instructions. When the computer program product runs on a computer or processor, the computer or processor is enabled to perform one or more steps in any one of the foregoing methods.

Another embodiment of this application further provides an audio processing system. The system includes an electronic device and headphones. The electronic device may be, for example, a mobile phone or a smart watch. The headphones may be noise reduction headphones. For work processes of the electronic device and the headphones, refer to the content of Embodiment 1 and Embodiment 2. Details are not described herein again.

What is claimed is:

1. An audio information processing method, comprising:
obtaining audio information, wherein the audio information is obtained by collecting sounds of an environment in which an electronic device is located;
determining that the audio information comprises a first alarm sound;
determining first location information of the first alarm sound based on the audio information, wherein the first location information is used to indicate an acoustic source direction of the first alarm sound; and
in response to determining that the audio information and previous audio information that comprises a second alarm sound have not been obtained within a preset duration:
determining a first sound, wherein the first sound comprises second location information, the second location information is used to indicate the acoustic source direction of the first alarm sound, the second location information is the same as or different from the first location information, the first sound is a 3D notification sound, and the 3D notification sound is a third alarm sound carrying a direction,
sending the first sound to headphones, and
playing, by the headphones, the first sound comprising the second location information; and
in response to determining that the audio information and the previous audio information that comprises the second alarm sound are obtained within the preset duration:
determining that a difference between the first location information of the first alarm sound in the audio information and first location information of the second alarm sound in the previous audio information that comprises the second alarm sound are within a preset range, detecting that the first alarm sound in the audio information and the second alarm sound in the previous audio information that comprises the second alarm sound are a same sound, and generating a distance coefficient, wherein the distance coefficient is used to represent an energy gain of the audio information relative to the previous audio information that comprises the second alarm sound, determining a second sound, wherein the second sound comprises the second location information and the energy gain, and
playing, by the headphones, the second sound comprising the second location information and the energy gain.

2. The audio information processing method according to claim 1, wherein the playing the second sound comprises:
sending the second sound to the headphones, and playing, by the headphones, the second sound.

3. The audio information processing method according to claim 1, wherein the determining first location information of the first alarm sound based on the audio information comprises:
locating, by using the audio information, an acoustic source of the first alarm sound based on an acoustic source localization algorithm of a microphone array to obtain the first location information of the first alarm sound.

4. The audio information processing method according to claim 1, wherein the determining first location information of the first alarm sound based on the audio information comprises:
determining third location information of the first alarm sound based on the audio information, wherein the third location information is used to indicate an acoustic source direction of the first alarm sound relative to the electronic device; and
performing coordinate transformation on the third location information of the first alarm sound to obtain the first location information of the first alarm sound.

5. The audio information processing method according to claim 1, wherein the determining a first sound, comprises:
obtaining a standard sound; and
processing the standard sound based on the first location information of the first alarm sound to obtain the first sound, wherein the first sound comprises the second location information.

6. The audio information processing method according to claim 5, wherein the processing the standard sound based on the first location information of the first alarm sound to obtain the first sound comprises:
obtaining a head-related impulse response (HRIR) value corresponding to the first location information of the first alarm sound; and
separately performing convolutional processing on the standard sound and the HRIR value to obtain the first sound.

7. The audio information processing method according to claim 5, wherein the processing the standard sound based on the first location information of the first alarm sound to obtain the first sound comprises:
obtaining a head-related transfer function (HRTF) value corresponding to the first location information of the first alarm sound; and
performing Fourier transform on the standard sound, and multiplying the standard value by the HRTF value to obtain the first sound.

8. The audio information processing method according to claim 1, wherein the detecting that the first alarm sound in the audio information and the alarm sound in the previous audio information that comprises the second alarm sound are a same sound comprises:
separately performing time domain to frequency domain conversion on the audio information and the previous audio information that comprises the second alarm sound to obtain amplitude spectra of the audio information and the previous audio information that comprises the second alarm sound; and performing similarity calculation on the audio information and the previous audio information that comprises the second alarm sound by using the amplitude spectra of the audio information and the previous audio information that comprises the second alarm sound to obtain a calculation result, wherein the calculation result is used to represent whether the audio information and the previous audio information that comprises the second alarm sound are a same sound.

9. The audio information processing method according to claim 8, wherein the performing similarity calculation on the audio information and the previous audio information that comprises the second alarm sound by using the amplitude spectra of the audio information and the previous audio information that comprises the second alarm sound to obtain a calculation result comprises:

performing similarity calculation on the audio information and the previous audio information that comprises the second alarm sound by using a Pearson correlation function to obtain a similarity, wherein if the similarity is greater than a threshold, the audio information and the previous audio information that comprises the second alarm sound are a same sound; or if the similarity is not greater than the threshold, the audio information and the previous audio information that comprises the second alarm sound are not a same sound.

10. The audio information processing method according to claim 8, wherein the performing similarity calculation on the audio information and the previous audio information that comprises the second alarm sound by using the amplitude spectra of the audio information and the previous audio information that comprises the second alarm sound to obtain a calculation result comprises:

predicting, by using a classification model, whether the audio information and the previous audio information that comprises the second alarm sound are a same sound.

11. The audio information processing method according to claim 1, wherein the detecting that the alarm sound in the audio information and the alarm sound in the previous audio information that comprises the second alarm sound are a same sound comprises:

separately extracting alarm sounds from the audio information and the previous audio information that comprises the second alarm sound; and determining whether the two extracted alarm sounds are a same alarm sound.

12. The audio information processing method according to claim 11, wherein the determining whether the two extracted alarm sounds are a same alarm sound comprises:

separately performing time domain to frequency domain conversion on the two extracted alarm sounds to obtain amplitude spectra of the two extracted alarm sounds; and performing similarity calculation on the two extracted alarm sounds by using the amplitude spectra of the two extracted alarm sounds to obtain a calculation result, wherein the calculation result is used to represent whether the two extracted alarm sounds are a same alarm sound.

13. The audio information processing method according to claim 12, wherein the performing similarity calculation on the two extracted alarm sounds by using the amplitude spectra of the two extracted alarm sounds to obtain a calculation result comprises:

performing similarity calculation on the two extracted alarm sounds by using a Pearson correlation function to obtain a similarity, wherein if the similarity is greater than a threshold, the two extracted alarm sounds are a same alarm sound; or if the similarity is not greater than a threshold, the two extracted alarm sounds are not a same alarm sound.

14. The audio information processing method according to claim 12, wherein the performing similarity calculation on the two extracted alarm sounds by using the amplitude spectra of the two extracted alarm sounds to obtain a calculation result comprises:

predicting, by using a classification model, whether the two extracted alarm sounds are a same alarm sound.

15. The audio information processing method according to claim 1, wherein after the generating a distance coefficient, the method further comprises:

determining that the distance coefficient is within a range of the distance coefficient.

16. The audio information processing method according to claim 15, further comprising:

determining that the distance coefficient is out of the range of the distance coefficient;

determining a third sound, wherein the third sound comprises the second location information and energy gains represented by endpoint values of the range of the distance coefficient; and playing the third sound.

17. The audio information processing method according to claim 1, wherein the determining that the audio information comprises the first alarm sound comprises:

invoking an alarm sound detection model to detect whether the audio information comprises the first alarm sound to obtain a detection result, wherein the detection result is used to indicate whether the audio information comprises the first alarm sound.

18. An electronic device, comprising:

one or more processors, a memory, and a wireless communication module, wherein the memory and the wireless communication module are coupled to the one or more processors, the memory is configured to store computer program code, the computer program code comprises computer instructions, and when the one or more processors execute the computer instructions, the one or more processors are caused to:

obtain audio information, wherein the audio information is obtained by collecting sounds of an environment in which an electronic device is located;

determine that the audio information comprises a first alarm sound;

determine first location information of the first alarm sound based on the audio information, wherein the first location information is used to indicate an acoustic source direction of the first alarm sound;

determine that the audio information and previous audio information that comprises a second alarm sound have not been obtained within a preset duration and, in response:

determine a first sound, wherein the first sound comprises second location information, the second location information is used to indicate the acoustic source direction of the first alarm sound, the second location information is the same as or different from the first location information, the first sound is a 3D notification sound, and the 3D notification sound is a third alarm sound carrying a direction, send the first sound to headphones, and play, by the headphones, the first sound comprising the second location information; and determine that the audio information and the previous audio information that comprises the second alarm sound are obtained within the preset duration and, in response:

determine that a difference between the first location information of the first alarm sound in the audio information and first location information of the second alarm sound in the previous audio information that comprises the second alarm sound are within a preset range, detecting that the first alarm sound in the audio information and the second alarm sound in the previous audio information that comprises the second alarm sound are a same sound, and generating a distance coefficient, wherein the distance coefficient is used to represent an energy gain of the audio information relative to the previous audio information that comprises the second alarm sound;

determine a second sound, wherein the second sound comprises the second location information and the energy gain; and play, by the headphones, the second sound comprising the second location information and the energy gain.

19. A non-transitory computer storage medium, configured to store a computer program, wherein when the computer program is executed by a processor, the the processor is caused to:

obtain audio information, wherein the audio information is obtained by collecting sounds of an environment in which an electronic device is located;

determine that the audio information comprises a first alarm sound;

determine first location information of the first alarm sound based on the audio information, wherein the first location information is used to indicate an acoustic source direction of the first alarm sound;

determine that the audio information and previous audio information that comprises a second alarm sound have not been obtained within a preset duration and, in response:

determine a first sound, wherein the first sound comprises second location information, the second location information is used to indicate the acoustic source direction of the first alarm sound, the second location information is the same as or different from the first location information, the first sound is a 3D notification sound, and the 3D notification sound is a third alarm sound carrying a direction, send the first sound to headphones, and play, by the headphones, the first sound comprising the second location information; and determine that the audio information and the previous audio information that comprises the second alarm sound are obtained within the preset duration and, in response:

determine that a difference between the first location information of the first alarm sound in the audio information and first location information of the second alarm sound in the previous audio information that comprises the second alarm sound are within a preset range, detecting that the first alarm sound in the audio information and the second alarm sound in the previous audio information that comprises the second alarm sound are a same sound, and generating a distance coefficient, wherein the distance coefficient is used to represent an energy gain of the audio information relative to the previous audio information that comprises the second alarm sound;

determine a second sound, wherein the second sound comprises the second location information and the energy gain; and play, by the headphones, the second sound comprising the second location information and the energy gain.

* * * * *